(12) United States Patent
Hirohata

(10) Patent No.: US 8,073,262 B2
(45) Date of Patent: Dec. 6, 2011

(54) IMAGE MATCHING APPARATUS, IMAGE MATCHING METHOD, AND IMAGE DATA OUTPUT PROCESSING APPARATUS

(75) Inventor: Hitoshi Hirohata, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 595 days.

(21) Appl. No.: 12/206,588

(22) Filed: Sep. 8, 2008

(65) Prior Publication Data
US 2009/0067727 A1 Mar. 12, 2009

(30) Foreign Application Priority Data
Sep. 10, 2007 (JP) ................................. 2007-234706

(51) Int. Cl.
  G06K 9/68 (2006.01)
  G10L 15/00 (2006.01)
  G10L 15/06 (2006.01)
(52) U.S. Cl. .................... 382/218; 704/239; 704/243
(58) Field of Classification Search .................. 382/100, 382/112, 173, 190, 286, 291, 305, 201, 209, 382/218, 219, 220; 358/1.9, 3.28, 296; 707/758, 707/780, 999.006, 749; 704/221, 236, 243, 704/247, 252
See application file for complete search history.

(56) References Cited

U.S. PATENT DOCUMENTS

| | | | |
|---|---|---|---|
| 5,465,353 A | 11/1995 | Hull et al. | |
| 5,799,115 A * | 8/1998 | Asano et al. | 382/305 |
| 6,463,432 B1 * | 10/2002 | Murakawa | 1/1 |
| 7,002,709 B1 * | 2/2006 | Terada et al. | 358/3.28 |
| 7,072,486 B1 * | 7/2006 | Akamatsu et al. | 382/100 |
| 2004/0234169 A1 | 11/2004 | Tojo | |
| 2006/0056660 A1 | 3/2006 | Tojo | |
| 2006/0204102 A1 | 9/2006 | Itoh et al. | |
| 2007/0253623 A1 | 11/2007 | Ohira et al. | |
| 2008/0177764 A1 | 7/2008 | Kise et al. | |

FOREIGN PATENT DOCUMENTS
CN  1832530  9/2006
(Continued)

OTHER PUBLICATIONS
US Office Action issued on Mar. 29, 2011 in U.S. Appl. No. 12/204,561.

Primary Examiner — Abolfazl Tabatabai
(74) Attorney, Agent, or Firm — Birch, Stewart, Kolasch & Birch, LLP

(57) ABSTRACT

In an image matching apparatus of the present invention, only a connected region in which the number of pixels included therein exceeds a threshold value, among connected regions that are specified by a labeling process section, is sent to a centroid calculation process section from a threshold value processing section, and a centroid (feature point) of the connected region is calculated. When it is determined that a target document to be matched is an N-up document, the threshold value processing section uses, instead of a default threshold value, a variant threshold value that varies depending on the number of images laid out on the N-up document and a document size that are found and detected by an N-up document determination section and a document size detection section. This makes it possible to determine a similarity to a reference document with high accuracy even in a case of an N-up document, i.e., a case where each target image to be matched is reduced in size from an original image.

5 Claims, 19 Drawing Sheets

FOREIGN PATENT DOCUMENTS

| | | |
|---|---|---|
| EP | 1914680 A1 | 4/2008 |
| JP | 5-110815 A | 4/1993 |
| JP | 7-282088 A | 10/1995 |
| JP | 8-255236 A | 10/1996 |
| JP | 11-25215 | 1/1999 |
| JP | 2000-76458 A | 3/2000 |
| JP | 2000-175031 A | 6/2000 |
| JP | 2000-333004 A | 11/2000 |
| JP | 2001-57631 A | 2/2001 |
| JP | 2005-4724 A | 1/2005 |
| JP | 2006-85298 A | 3/2006 |
| JP | 2006/126761 A | 5/2006 |
| JP | 2006-33248 A | 12/2006 |
| JP | 2007-299210 A | 11/2007 |
| WO | WO-2006/092957 A1 | 9/2006 |

* cited by examiner

| -3 | -2 | -1 | 1 | -1 | -2 | -3 |
|---|---|---|---|---|---|---|
| -2 | -2 | 1 | 4 | 1 | -2 | -2 |
| -1 | 1 | 8 | 15 | 8 | 1 | -1 |
| 1 | 5 | 16 | 25 | 16 | 5 | 1 |
| -1 | 1 | 8 | 15 | 8 | 1 | -1 |
| -2 | -2 | 1 | 4 | 1 | -2 | -2 |
| -3 | -2 | -1 | 1 | -1 | -2 | -3 |

FIG. 14 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 14 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

|  | ACCUMULATED VALUES OF X-COORDINATE | ACCUMULATED VALUES OF Y-COORDINATE | NUMBER OF PIXELS |
|---|---|---|---|
| LABEL 1 | 38 | 42 | 9 |
| LABEL 2 | 33 | 18 | 3 |
| ⋮ | ⋮ | ⋮ | ⋮ |

| LABEL | TABLE VALUE |
|---|---|
| 1 | 1 |
| 2 | 2 |
| 3 | 1 |
| ⋮ | ⋮ |

FIG. 19

| INPUT DOCUMENT SIZE | NUMBER OF IMAGES LAID OUT ON N-UP DOCUMENT | MULTIPLIER COEFFICIENT FOR THRESHOLD VALUE |
|---|---|---|
| A4 | 2 | 0.7 |
| A4 | 4 | 0.5 |
| A4 | 8 | 0.35 |
| A3 | 2 | 1 |
| A3 | 4 | 0.7 |
| A3 | 8 | 0.5 |
| B4 | 2 | 0.85 |
| B4 | 4 | 0.6 |
| B4 | 8 | 0.4 |

IMAGE MATCHING APPARATUS, IMAGE MATCHING METHOD, AND IMAGE DATA OUTPUT PROCESSING APPARATUS

This Nonprovisional application claims priority under U.S.C. §119(a) on Patent Application No. 234706/2007 filed in Japan on Sep. 10, 2007, the entire contents of which are hereby incorporated by reference.

FIELD OF THE INVENTION

The present invention relates to an image matching apparatus and an image matching method, each of which adopts an image matching technique for determining a similarity between an image of a target document to be matched and an image of a preliminarily stored reference document, and further relates to an image data output processing apparatus for controlling, in accordance with a similarity determination result, an output process such as a copying process, a transmitting process, an editing process, or a filing process with respect to input image data of a target document.

BACKGROUND OF THE INVENTION

There have been proposed image matching techniques for comparing (i) image data obtained by reading a document by use of a scanner or the like with (ii) image data of a preliminarily stored reference document so as to determine a similarity between the image data and the preliminarily stored image data.

Examples of the method for determining a similarity include: a method in which a keyword is extracted from an image with OCR (Optical Character Reader) so as to carry out matching with the keyword; a method in which only a ruled line image having a ruled line is focused on as a target image, and matching is carried out with features of the ruled line (see Patent Document 1); and a method in which a similarity is determined based on color distributions of an input image and a storage image (see Patent Document 2).

Patent Document 3 discloses a technique in which a descriptor is formed from features of an input document, and matching between the input document and a document stored in a document database is carried out by use of the descriptor and a descriptor database in which descriptors are stored and which indicates a list of documents including features from which the descriptors are formed. A descriptor is selected such that the descriptor is invariant for distortions generated by digitalization of a document and differences between an input document and a document used for matching in a document database.

In this technique, when the descriptor database is scanned, votes for each document in the document database are accumulated, and a document having the maximum number of votes obtained or a document whose number of votes exceeds a threshold value is used as a matched document.

Further, Patent Document 4 discloses a technique in which a plurality of feature points are extracted from a digital image, a set of local feature points are determined out of the extracted feature points, a partial set of feature points is selected out of the determined set of local feature points, invariants relative to geometric transformation each as a value characterizing the selected partial set are calculated in accordance with plural combinations of feature points in the partial set, features are calculated from combinations of each of the calculated invariants, and a document and an image corresponding to the digital image data is searched by voting documents and images having the calculated features stored in a database.

Conventionally, in an image data output processing apparatus, e.g., a copying machine, a facsimile device, a scanning device, or a multi-function printer, which carries out, with respect to input image data (image data of a target document to be matched), an output process such as a copying process, a transmitting process, an editing process, or a filing process, when it is determined that an input image of a target document is similar to an image of a reference document by use of such the image matching techniques, its output process is controlled.

For example, there has been known techniques of a color image forming apparatus as anti-counterfeit techniques with respect to a paper currency or a valuable stock certificate, in which it is determined whether or not input image data is identical with an image of a paper currency or a valuable stock certificate in accordance with a pattern detected from the input image data, and when it is determined that the input image data is identical with a reference image, (i) a specified pattern is added to an output image so that an image forming apparatus that has made a copy of the image data can be specified from the output image, (ii) a copied image is blacked out, or (iii) a copying operation is prohibited with respect to the input image data.

Patent Document 1: Japanese Unexamined Patent Publication, Tokukaihei, No. 8-255236 (published on Oct. 1, 1996)

Patent Document 2: Japanese Unexamined Patent Publication, Tokukaihei, No. 5-110815 (published on Apr. 30, 1993)

Patent Document 3: Japanese Unexamined Patent Publication, Tokukaihei, No. 7-282088 (published on Oct. 27, 1995)

Patent Document 4: International Publication No. WO 2006/092957, pamphlet (published on Sep. 8, 2006)

However, such a conventional image matching apparatus has a problem in which, in a case where a target document is an N-up document or a reduced-size document, it is difficult to precisely determine a similarity to a reference document.

Conventionally, there have been known some image matching apparatuses in which input image data is binarized, a connected region in which pixels in the binarized image are connected to each other is specified, a feature point of the connected region thus specified is extracted based on coordinates, in the binarized image, of each pixel included in the connected region, features indicative of a similarity of the image are calculated based on the extracted feature point, and similarity determination is carried out.

In such the similarity determination, a difference in a condition for specifying a connected region decreases accuracy in determination. The difference in a condition for specifying a connected region means a state in which a partial image that is specified as a connected region in one of two images for comparison is not specified as a connected region in another one of the two images.

As the connected region, a region that includes more than a specified number of pixels (the default number of pixels) is specified. This is because an isolated dot, a noise, and the like are to be removed.

However, in the conventional image matching apparatuses, a threshold value for removing such an isolated dot and a noise is fixed to a default threshold value. The default threshold value is a value capable of removing an isolated dot and a noise in image data of a reference document. In a case where a connected region is specified in an image reduced in size from an original image size (e.g., an N-up document, a reduced-size document, and the like) by use of the same threshold value as the reference document, in a part in which the number of pixels actually exceeds the threshold value and which should be specified as a connected region, the number of pixels cannot exceed the threshold value because the image is reduced in size, thereby resulting in that the part is not specified as the connected region. Consequently, the number of feature points decreases and features differ, thereby decreasing accuracy in determination.

SUMMARY OF THE INVENTION

An object of the present invention is to provide an image matching apparatus, an image matching method, and an image data output apparatus including the same, in each of which it is determined whether or not an image of a target document to be matched is similar to an image of a reference document, and each of which can determine a similarity to a reference document with high accuracy even in a case of an N-up document, i.e., a case where each target image to be matched is reduced in size from an original image.

In order to achieve the above object, an image matching apparatus of the present invention includes a features extraction section for extracting features of an image from input image data, the features extraction section extracting the features based on a connected region in which pixels in a binarized image of the image data are connected to each other and the number of the pixels exceeds a default threshold value, said apparatus (i) causing the features extraction section to extract the features from input image data of a target document to be matched, and (ii) determining whether or not the target document has a similar image to that of a preliminarily stored reference document based on a comparison of the features thus extracted with features of the image of the reference document. The image matching apparatus further includes an N-up document determination section that determines (i) whether or not the target document is an N-up document on which plural documents are laid out, and (ii) the number of images laid out on the N-up document when it is determined that the target document is an N-up document; and a document size detection section that detects a document size of the target document, when the N-up document determination section determines that the target document is an N-up document, the features extraction section extracting the features, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

Image data that is inputted into the image matching apparatus includes: image data that is scanned and inputted by a scanner; and further, electronic data formed by use of a computer (software), e.g., electronic data that is formed by filling in a form of the electronic data with necessary information by use of a computer (software).

In the arrangement, in the case where the N-up document determination section determines that a target document to be matched is an N-up document, the features extraction section extracts the features by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

With the arrangement, even when the target document is an N-up document and images are reduced in size, a threshold value that is used for extracting of a connected region to be subjected to features calculation is the variant threshold value that varies depending on the document size and the number of the images laid out on the N-up document, that is, a threshold value that varies depending on a reduction ratio of the target document, thereby improving accuracy in matching in an N-up document.

In order to achieve the above object, an image matching method of the present invention includes the step of: (a) extracting features of an image from input image data based on a connected region in which pixels in a binarized image of the image data are connected to each other and the number of the pixels exceeds a default threshold value, wherein the features are extracted from input image data of a target document to be matched in the step (a), and it is determined whether or not the target document has a similar image to that of a preliminarily stored reference document, based on a comparison of the features thus extracted with features of the image of the reference document. The method, further includes the steps of: (b) determining (i) whether or not the target document is an N-up document on which plural documents are laid out, and (ii) the number of images laid out on the N-up document when it is determined that the target document is an N-up document; and (c) detecting a document size of the target document, when it is determined that the target document is an N-up document in the step (b), the step (a) is carried out such that the features are extracted, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

In the similar manner to the image matching apparatus of the present invention that has been already described, in the image matching method, it is possible to extract features under the same condition as the reference document even when the target document is an N-up document and images are reduced in size from their original sizes. This makes it possible to accurately determine a similarity to a reference document.

Further, the present invention also includes an image data output processing apparatus that carries out an output process with respect to image data, the apparatus including: the image matching apparatus of the present invention; and an output process control section that controls an output process with respect to image data of the target document in accordance with a determination result of the image matching apparatus.

As described above, the image matching apparatus of the present invention can determine a similarity with high accuracy, even in a case where the target document is an N-up document and images thereof are reduced in size from their original size.

Accordingly, in a case where image data to be subjected to the output process is similar to that of a reference document, the image data output processing apparatus including such the image matching apparatus can control the output process with high accuracy. This can increase reliability.

Furthermore, the image matching apparatuses may be realized by a computer. In this case, the present invention includes a computer-readable storage medium in which an image processing program that causes a computer to function as respective sections in the image matching apparatus so that the image matching apparatus is realized in the computer is stored.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 14 (*a*) and FIG. 14 (*b*) are explanatory drawings each illustrating an example of a hash value of each feature point stored in a hash table and an index indicative of input image data.

FIG. 19 is an explanatory view illustrating a multiplier coefficient for a default threshold value, the multiplier coefficient being set so as to vary depending on a document size of a target document to be matched and the number of images laid out on the N-up document, in a threshold process section of the centroid calculation section provided in the image data output processing apparatus illustrated in FIG. 2.

DESCRIPTION OF THE EMBODIMENTS

An embodiment of the present invention is explained below. Explained in the embodiment is a case where the present invention is applied to a digital color copying machine, however, the present invention is not limited to this.

Figure 2:
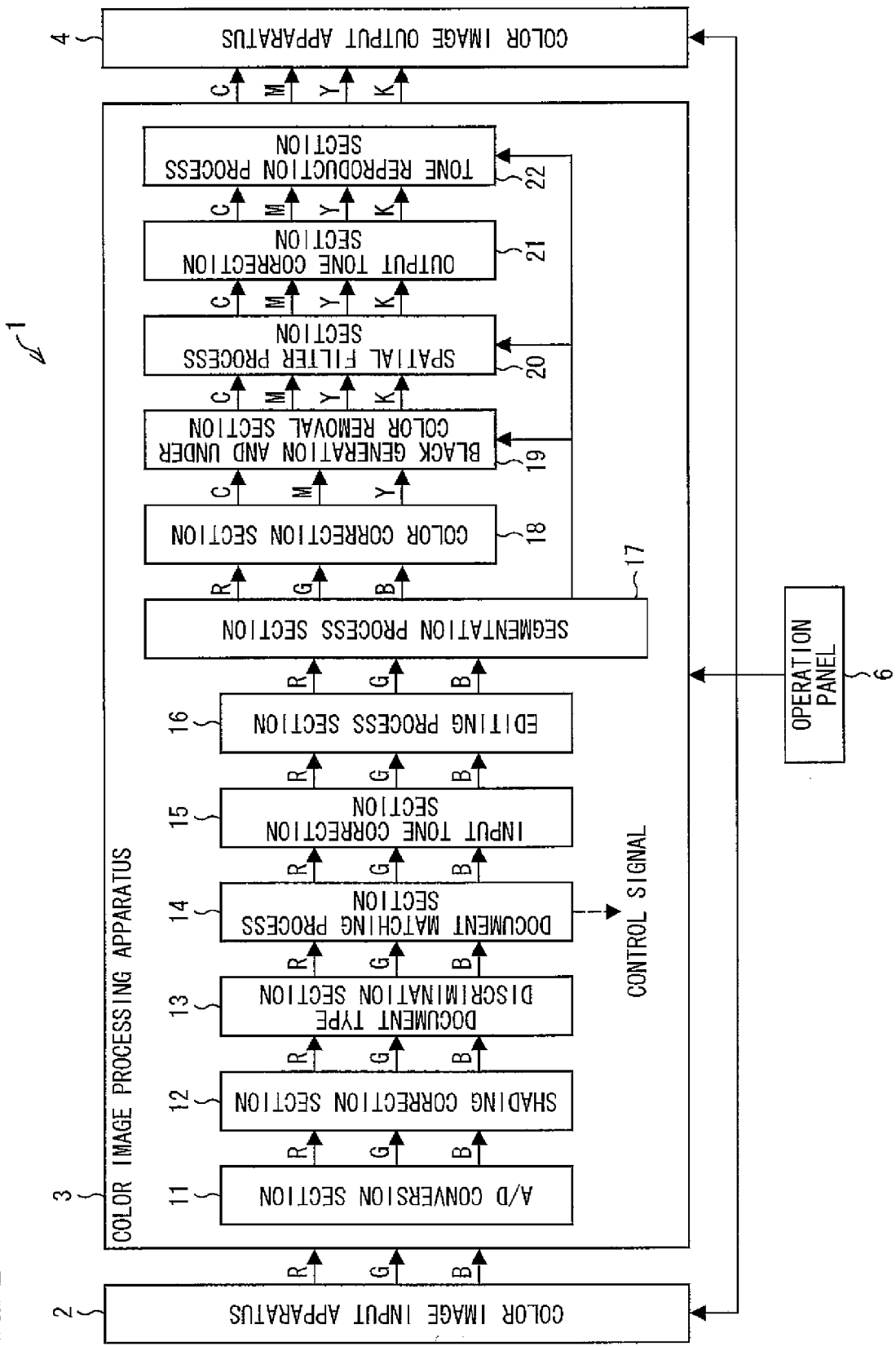
FIG. 2 is a block diagram schematically illustrating an image data output processing apparatus as a digital color copying machine according to one embodiment of the present invention.

FIG. 2 is a block diagram schematically illustrating a digital color copying machine (image data output processing apparatus) 1 according to the present embodiment.

As illustrated in FIG. 2, the digital color copying machine 1 includes a color image input apparatus 2, a color image processing apparatus 3, a color image output apparatus 4, and an operation panel 6.

The color image input apparatus 2 that reads out an image of a document and generates image data, is, for example, composed of a scanner (not shown) including a CCD (Charge Coupled Device) for converting optical information into an electric signal. The color image input apparatus 2 reads an optical image reflected from a document as RGB (R: Red, G: Green, B: Blue) analog signals and supplies the RGB analog signals to the color image processing apparatus 3.

The color image processing apparatus 3 carries out various processes with respect to the analog signals received from the color image input apparatus 2 so that the analog signals are converted into a format that can be handled by the color image output apparatus 4, and supplies the signals thus processed to the color image output apparatus.

The color image processing apparatus 3 includes, at an input stage, an A/D (Analog/Digital) conversion section 11 for converting RGB analog signals into digital signals. The A/D conversion section 11 converts the image data in the form of the analog signals received by the color image processing apparatus 3 into digital signals.

The RGB signals converted into the digital signals are then transmitted to a shading correction section 12, a document type discrimination section 13, a document matching process section 14, an input tone correction section 15, an editing process section 16, a segmentation process section 17, a color correction section 18, a black generation and under color removal section 19, a spatial filter process section 20, an output tone correction section 21, and a tone reproduction process section 22 in this order. Ultimately, the RGB signals are converted into CMYK signals as digital signals. The CMYK digital signals outputted from the tone reproduction process section 22 are temporarily stored in a memory (not shown) and then supplied to the color image output apparatus 4.

The following explanation deals with each process of the sections constituting the color image processing apparatus 3. The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal which can be processed easily by an image processing system used in the color image processing apparatus 3.

The RGB signals (RGB density (pixel value) signals) whose various distortions have been removed and color balance has been adjusted by the shading correction section 12 are then supplied to the document type discrimination section 13.

The document type discrimination section 13 discriminates a document type of the input image data in accordance with the RGB signals transmitted from the shading correction section 12. Namely, the document type discrimination section 13 determines whether the document is a text document, a photographic-picture, which means a continuous tone image, for example, silver halide photography, a text/photographic-picture document that includes a text and a photographic-picture, or the like document. A document type discrimination result is used in subsequent processes.

In this embodiment, the document type discrimination section (N-up document determination section) 13 also determines whether the document from which the input image data is read out is an N-up document or not. If the document is determined as an N-up document, the document type discrimination section 13 further calculates the number of images laid out on the N-up document.

The N-up document means that a single-sheet document includes a plurality of document images laid out thereon, and is, for example, an N-in-1 (N=2, 4, 6, 8, 9 . . . ) document, i.e., a single-sheet document on which N sheets of document images are laid out collectively. Processes, in the document type discrimination section 13, of discriminating an N-up document and calculating the number of images laid out on the N-up document will be described later.

Meanwhile, the document type discrimination section 13 transmits the input signals as received from the shading correction section 12, without any modification, to the subsequent document matching process section 14.

The document matching process section (similarity determination section) 14 has a function of extracting features of an image of the image data from the RGB signals (input image data) transmitted from the document type discrimination section 13.

While extracting features of an image of input image data (a target image to be matched), the document matching process section 14 further carries out a similarity determination process of determining whether or not the image of the input image data is similar to that of a preliminarily stored reference document (hereinafter also referred to as a reference image) whose features have been extracted by the function of extracting features, based on a comparison of the features thus extracted with features of the image of the reference document.

When it is determined that the image of the input image data is similar to the reference image in the similarity determination process, the document matching process section 14 then supplies a control signal to control an output process such as prohibiting an output process with respect to the input image data (an image forming process in the case of the color copying machine), degrading an image quality, or filing of the image data. More details of the document matching process section 14 will be described later.

Meanwhile, the document matching process section 14 transmits the input signals as received from the document type discrimination section 13, without any modification, to the input tone correction section 15.

The input tone correction section 15 removes background color (density component of the background: background density) from the RGB signals transmitted from the document matching process section 14, and adjusts image quality such as contrast.

In a case where the document is an N-up document and requires to be edited, the editing process section 16 edits the RGB signals transmitted from the input tone correction section 15, from which signals background color (density component of the background: background density) has been removed and for which image quality such as contrast has been adjusted.

For example, in a case where an N-up document is to be outputted such that plural documents laid out on the N-up document are separately outputted one by one, the editing process section 16 determines positions to divide the N-up document, divides an image (of the N-up document) according to the positions, rotates and enlarges each of divided images, and edits each image so that the image is converted into separated image data.

In a case where the RGB signals transmitted from the input tone correction section 15 are not the ones of an N-up document, or the RGB signals are the ones of an N-up document but do not require the editing process, the RGB signals as received from the input tone correction section 15 are transmitted, without any modification, to the segmentation process section 17 from the editing process section 16.

The RGB signals edited by the editing process section or the RGB signals transmitted, without any modification, from the editing process section 16 are sent to the segmentation process section 17.

The segmentation process section 17 separates each pixel of an input image into either one of a text region, a halftone dot region, or a photograph (continuous tone) region, according to the RGB signals. On the basis of a result of the separation, the segmentation process section outputs a segmentation class signal, indicating which region a pixel of the input image belongs to, to the color correction section 18, the black generation and under color removal section 19, the spatial filter process section 20, and the tone reproduction process section 22. The segmentation process section 17 also outputs the input signals as received from the input tone correction section to the subsequent color correction section 18 without any modification.

The color correction section 18 removes color impurity on the basis of spectral characteristics of CMY (C: Cyan, M: Magenta, and Y: Yellow) color materials including a useless absorption component, in order to realize a faithful color reproduction.

The black generation and under color removal section 19 performs (i) a black generation process for generating a black (K) signal from three color (CMY) signals after the color correction process and (ii) a generation process of new CMY signals by removing the K signal obtained by the black generation process from the original CMY signals. As a result, the three CMY signals are converted into four CMYK signals.

With the use of a digital filter, the spatial filter process section 20 performs a spatial filter process on the basis of a segmentation class signal, with respect to the image data which is received in the form of the CMYK signals from the black generation and under color removal section 19. In the spatial filter process, the spatial filter process section 20 corrects a spatial frequency characteristic, so as to reduce blur or granularity deterioration in an output image. The tone reproduction process section 22, as with the spatial filter process section 20, performs a predetermined process with respect to the image data in the form of the CMYK signals, on the basis of the segmentation class signal.

For example, in the region separated into a text region by the segmentation process section 17, the spatial filter process section 20 strongly emphasizes a high frequency component in an edge enhancement process of the spatial filter process, in order to improve reproducibility of a black text or a color text especially. Concurrently, the tone reproduction process section 22 selects either a binarization process or a multi-level dithering process on a high-resolution screen suitable for reproducing the high frequency component.

In the region separated into a halftone dot region by the segmentation process section 17, the spatial filter process section 20 performs a low pass filter process for removing an input halftone dot component. The output tone correction section 21 performs an output tone correction process in which a signal such as a density (pixel value) signal is converted into a halftone dot area rate that is characteristics of the color image output apparatus 4. Subsequently, the tone reproduction process section 22 performs a tone reproduction process (half tone generation) so that, ultimately, an image is segmented into pixels and each tone of the pixels can be reproduced. In the region separated into a photograph region by the segmentation process section 17, the binarization process or the multi-level dithering process is performed on a screen suitable for tone reproduction.

Furthermore, in the present embodiment, the document type discrimination result is taken into consideration in each process performed subsequently to the segmentation process. In each process, in a case where it is determined that the input image does not include plural regions collectively, the segmentation process is performed in a similar manner to the above. On the other hand, in a case where it is determined that the input image includes plural regions, the segmentation process is performed with the use of an intermediate parameter between parameters used in each region process. In this case, a parameter for a region that has not been discriminated in the document type discrimination process is not used.

For example, when an input image is determined as a text document, the segmentation process is performed in such a manner that a region separated into a text and a line drawing is considered effective, while a region, such as a halftone dot and a photograph, which is separated into a continuous tone, is regarded as an erroneous separation and the region is not reflected to the segmentation process. This is because, even if the input image is a text document, the region determined as a continuous tone may be discriminated wrongly depending on a document type.

On the basis of a result of the segmentation process, the input tone correction process and the tone reproduction process remove more highlight, and use a correction curve for making a high contrast.

While a color correction process focusing on a color saturation (chroma) is carried out with respect to a color text, a generous amount of black is set with respect to a black text in the black generation and under color removal process. With respect to a text, the spatial filter process emphasizes an edge of the text, and a parameter is switched over, e.g., setting of filter coefficients is performed so that a smoothing process is mildly carried out.

When an input image is determined as a text/photographic-picture document, each process is carried out by use of an intermediate parameter between parameters used in a text document process and a photographic-picture document process. In the segmentation process, a region separated into a text, a line drawing, or a photograph is considered effective, while a region separated into a halftone dot is regarded as an erroneous separation and the region is not reflected to the segmentation process. This is because, even if the input image is a text/photographic-picture document, the region separated into a halftone dot may be discriminated wrongly depending on a document type.

Depending on which of the text document and the photographic-picture document is focused on, in the input tone correction process and the tone reproduction process, highlight is removed and contrast is adjusted by use of a parameter intermediate between parameters used in the photographic-picture document process and the text document process, and the color correction process is performed so that a color saturation (chroma) strength and a tone balance are not immoderate. Meanwhile, in the black generation and under color removal process, an amount of black is adjusted moderately so as not to affect the photographic-picture image.

The input image data that has been subjected to each of the processes mentioned above is temporarily stored in a memory (not shown). The input image data is read out from the memory at a predetermined timing and supplied to the color image output apparatus 4. Then, the input image data is subjected to the similarity determination process by the document matching process section 14. In a case where there is a similarity between the image of the input image data and a reference image, a control signal to prohibit the output process with respect to the input image data is supplied. In this case, when the image data is read out from the memory, a process of deleting or blacking out the image data is carried out so that the target image does not appear, thereby resulting in that the input image data is outputted as a blank paper or a blacked-out image.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The operation panel 6 includes, for example, a display section (not shown) such as a liquid crystal display and setting buttons (not shown). The operation panel 6 causes the display section to display information corresponding to an instruction of a main control section (not shown) of the digital color copying machine 1 and transmits information, inputted by the user with use of the setting buttons, to the main control section. The user can input, from the operation panel 6, a processing request, the number of images to be processed, or the like with respect to the image data.

The main control section is composed of a CPU (Central Processing Unit) and the like for example. In accordance with a program or various data stored in a ROM (not shown) or the like and information which is entered from the operation panel 6, the main control section controls each operation of each section of the digital color copying machine 1.

The following explanation deals with processes, in the document type discrimination section 13, of determining whether a target document is an N-up document or not, and of detecting the number of images laid out on the N-up document.

The document type discrimination section 13 calculates, from RGB signals (image data), distributions of the number of density transition (or the number of edges), in which a pixel value varies from 0 to 1 or vice versa, in each line of an image in main and sub scanning directions. On the basis of the distributions, the document type discrimination section 13 determines whether a target document is an N-up document or not, and detects the number of images laid out on the N-up document when the target document is determined as an N-up document.

Figure 3:
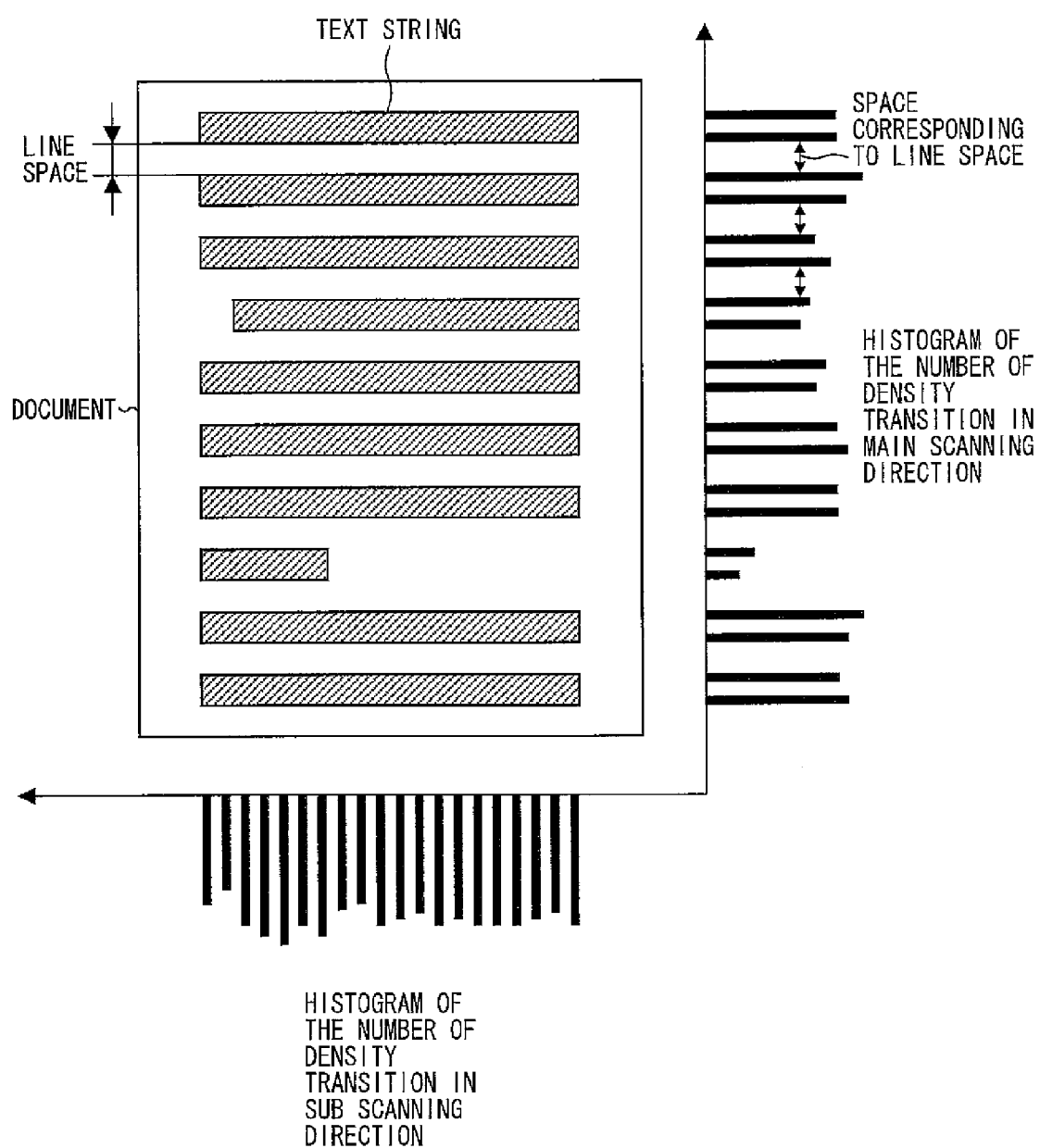
FIG. 3 is an explanatory drawing illustrating a process of determining (i) whether or not a target document to be matched is an N-up document and (ii) the number of images laid out on the N-up document in a document type discrimination section provided in the image data output processing apparatus in FIG. 2.

FIG. 3 illustrates a histogram of the number of density transition in a non N-up document in each of main and sub scanning directions, which non N-up document includes an image(s) in which (i) a text string extends in the sub scanning direction that is a paper-lateral direction (document-lateral direction) and (ii) line spaces are arranged side by side in the main scanning direction that is a paper-longitudinal direction (document-longitudinal direction).

In such the non N-up document, as illustrated in FIG. 3, the distribution of the number of density transition in the main scanning direction includes the number of density transition at every predetermined space corresponding to a space between text lines. On the other hand, the distribution of the number of density transition in the sub scanning direction is continuous except for a blank space in a periphery of the document.

Figure 4:
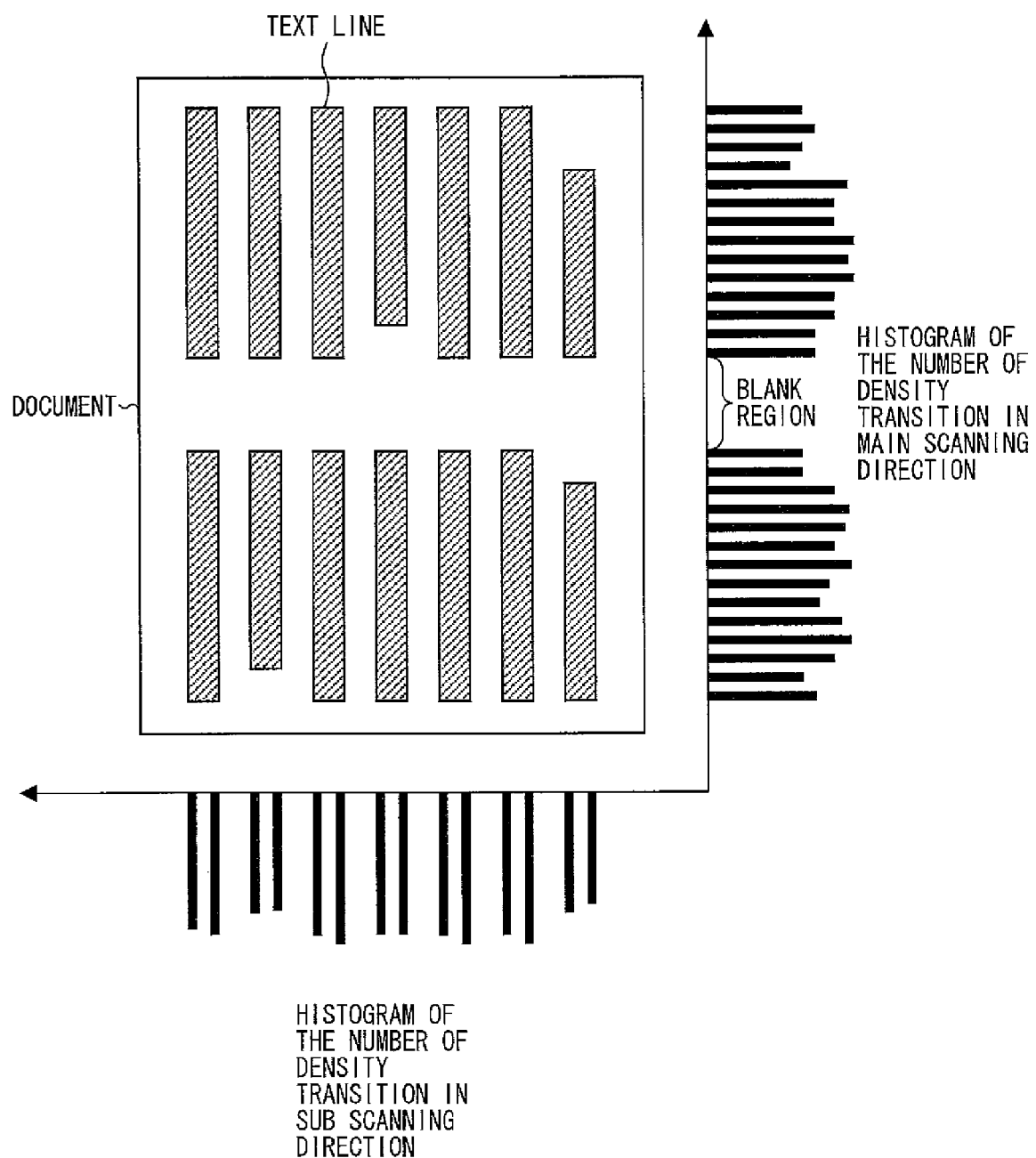
FIG. 4 is an explanatory drawing illustrating a process of determining (i) whether or not a target document to be matched is an N-up document and (ii) the number of images laid out on the N-up document in the document type discrimination section provided in the image data output processing apparatus in FIG. 2.

An N-up document on which two documents, such as the one illustrated in FIG. 3, are printed in a 2-in-1 mode is arranged such that, as illustrated in FIG. 4, two images are laid out side by side in a main scanning direction (a paper-longitudinal direction of the N-up document). In each of the images, a text string extends in the main scanning direction (a paper-lateral direction in their original documents) and line spaces are arranged side by side in a sub scanning direction (a paper-longitudinal direction in the original documents).

In such the N-up document, as illustrated in FIG. 4, in a histogram of the number of density transition in each of the main and sub scanning directions, there are two continuous distributions of the number of density transition in the main scanning direction. A blank region corresponding to blank spaces of the original documents exists between these distributions of the number of density transition. On the other hand, a distribution of the number of density transition in the sub scanning direction includes the number of density transition at every predetermined spaces corresponding to line spaces.

On the basis of the histogram, in a case where (i) there are two continuous distributions of the number of density transition in the main scanning direction, and (ii) there is a blank region between the two continuous distributions, whose number of density transition is not more than a predetermined value (e.g., 20) and the blank region is around 20 mm in width (i.e., around 170 lines in a case where a resolution is 300 dpi) (although it depends on a layout of an N-up document), it is determined that a target image to be matched is that of a 2-in-1 document.

Note, however, that, in a case where it is determined whether a target document includes a blank region or not, when a first line or a last line is included in a line whose number of density transition is not more than a predetermined value, the line is determined as a blank space in a periphery of the target document, and requires to be excluded.

As such, it is determined whether or not a target document includes a blank region, by calculating the distributions of the number of density transition in the main and sub scanning directions. This makes it possible to determine whether the target document is a 2-in-1 document or not.

The above explanation deals with how to discriminate a 2-in-1 document whose number of images laid out thereon is 2. In a case of a 4-in-1 document whose number of images laid out thereon is 4, the document has blank regions corresponding to blank spaces to separate each document image in the main and sub scanning lines. Accordingly, it is possible to determine whether a target document is a 4-in-1 document or not in the similar manner.

In this embodiment, the distributions of the number of density transition (or the number of edges) in each line are calculated respectively in the main and sub scanning directions. Alternatively, an average value or a variance value of a pixel value per line may be also used.

As a method other than the method of discriminating an N-up document by use of such image data, it is also possible to discriminate an N-up document by setting conditions.

For example, in a case where a split-image output mode is selected as an image mode by input operation with the use of the operation panel 6, a main control section (CPU) for controlling operations of sections in the digital copying machine 1 recognizes this mode. Accordingly, it can be determined that input image data is that of an N-up document.

Alternatively, in a case where the color image input apparatus 2 is a scanner that is connected to a computer, a document type is selected in a setting screen for readout conditions (a setting screen of a scanner driver), so that the main control section (CPU) recognizes the selection result. Herewith, an N-up document can be discriminated.

Next explained is the document matching process section (a document matching process apparatus) 14 in detail. The document matching process section 14 according to the present embodiment extracts plural feature points from the input image data, and determines a set of local feature points relative to each of the extracted feature points. Then, the document matching process section 14 selects a partial set of feature points out of the determined set of local feature points, and calculates invariants each of which is relative to geometric transformation as a value characterizing the selected partial set in accordance with plural combinations of feature points in the partial set. The section 14 calculates a hash value (features (feature vectors)) by combining the calculated invariants, and votes for a reference image corresponding to the hash value. Thereby, a reference image similar to the input image data is retrieved and a similarity determination process is carried out with respect to the reference image.

Figure 5:
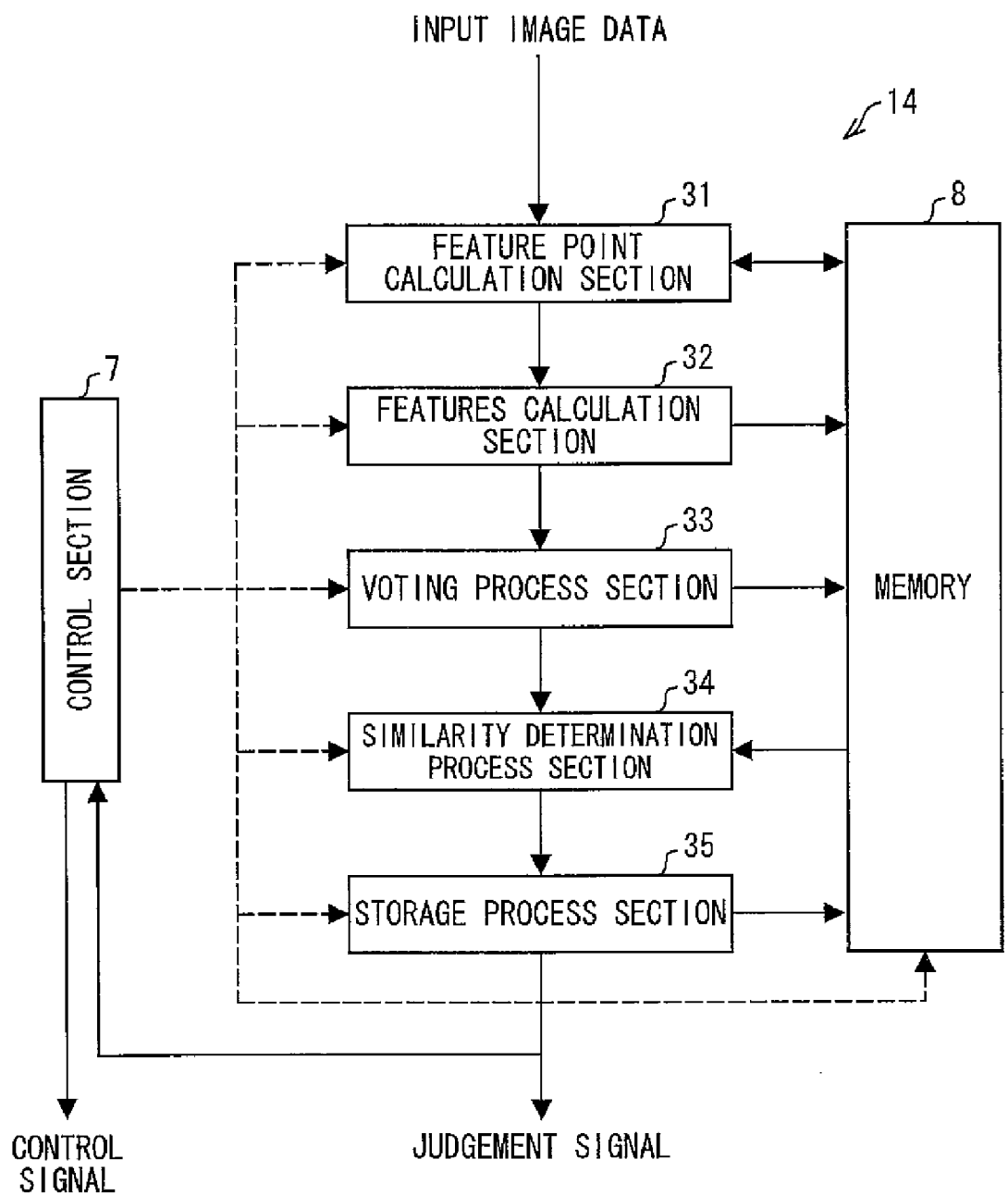
FIG. 5 is a block diagram schematically illustrating an arrangement of a document matching process section provided in the image data output processing apparatus in FIG. 2.

FIG. 5 is a block diagram schematically illustrating an arrangement of the document matching process section 14. As illustrated in FIG. 5, the document matching process section 14 includes a feature point calculation section 31, a features calculation section 32, a voting process section 33, a similarity determination process section 34, a storage process section 35, a control section 7, and a memory 8. A features extraction section of the present invention is constituted by the feature point calculation section 31 and the features calculation section 32.

The control section 7 controls operations of the sections of the document matching process section 14. Note that, the control section 7 may be provided in the main control section for controlling operations of the sections of the digital color copying machine 1 or may be provided separately from the main control section so as to cooperate with the main control section in controlling operations of the document matching process section 14.

When it is determined that there is no similarity (an image of the input image data is not identical with the reference image) in accordance with a result of the similarity determination process by the document matching process section 14, the control section (output process control section) 7 supplies a control signal to permit an output process with respect to the image data. On the other hand, when it is determined that there is a similarity (an image of the input image data is identical with the reference image), the control section 7 supplies a control signal to control an output process with respect to the image data (hereinafter referred to as the input image data).

The memory 8 stores various data to be used in processes of the sections of the document matching process section 14, process results, and the like.

The feature point calculation section 31 extracts a connected part of a text string or a line from the input image data and calculates a centroid of the connected part as a feature point. Here, in a storage process of a reference image, the input image data indicates image data of an image to be stored. On the other hand, in the similarity determination process, the input image data indicates image data of a target image to be matched (hereinafter also referred to as target image data in some cases).

Figure 6:
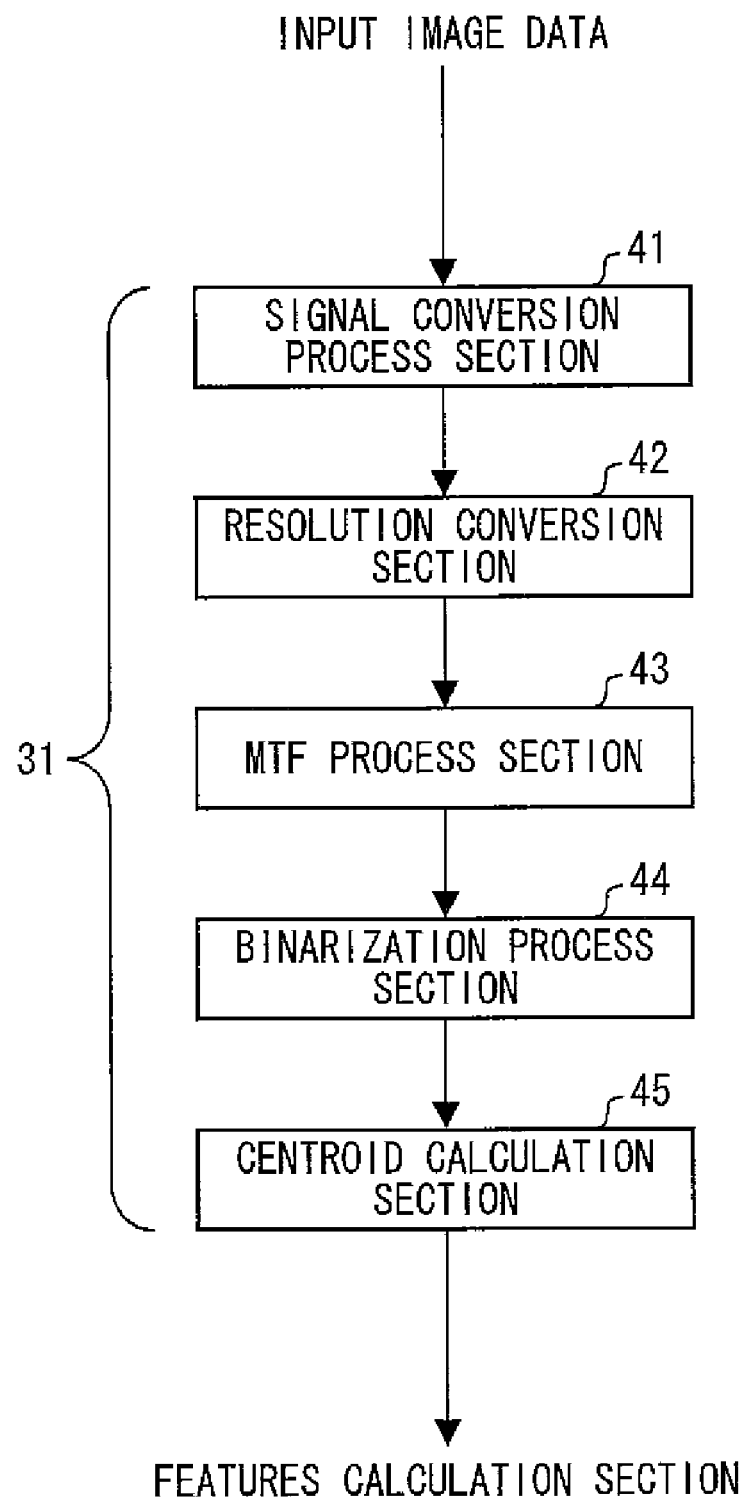
FIG. 6 is a block diagram schematically illustrating an arrangement of a feature point calculation section provided in the image data output processing apparatus in FIG. 2.

FIG. 6 is a block diagram schematically illustrating an arrangement of the feature point calculation section 31. The arrangement illustrated in FIG. 6 is one exemplary arrangement of the feature point calculation section 31, and not limited to this. For example, a feature point may be calculated by various conventional methods.

As illustrated in FIG. 6, the feature point calculation section 31 includes a signal conversion process section 41, a resolution conversion section 42, an MTF process section 43, a binarization process section 44, and a centroid calculation section 45.

In a case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Y_j = 0.30 R_j + 0.59 G_j + 0.11 B_j \tag{1}$$

"$Y_j$" refers to a luminance signal of each pixel, and each of $R_j$, $G_j$, and $B_j$ is a color component of the RGB signals, and "j" subsequently added to "Y", "R", "G", and "B" represents a value given to each pixel (j is an integer not less than 1).

Alternatively, the RGB signals may be converted into CIE1976L*a*b* signal (CIE: Commission International de l' Eclairage, L*: lightness, a*, b*: chromaticity).

The resolution conversion section 42 scales up/down the input image data. For example, in a case where the input image data is optically scaled up/down by the image input apparatus 2, the resolution conversion section 42 scales up/down the input image data again so as to have a predetermined resolution (hereinafter referred to as a default resolution).

Further, in order to reduce processes carried out by the subsequent process sections, the resolution conversion section 42 may convert resolution so as to make the resolution lower than a resolution in being scanned by the image input apparatus 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from a CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MTF deterioration causes the scanned image to blur.

Figures 7, 8:
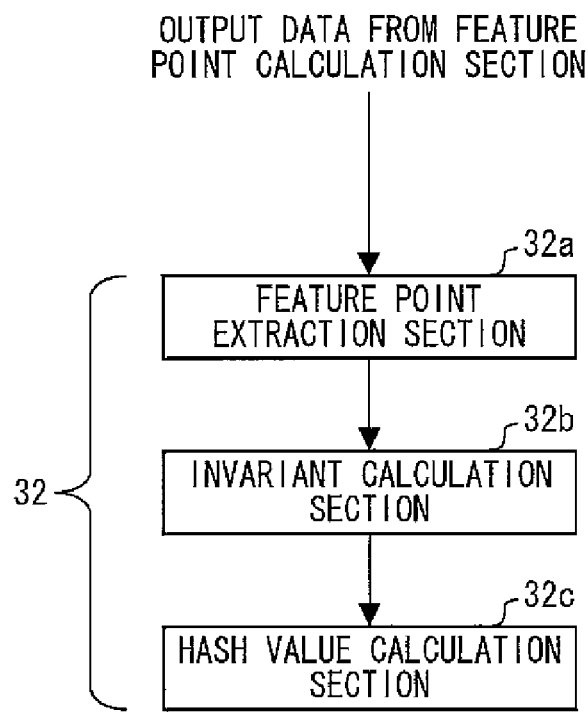
FIG. 7 is a block diagram schematically illustrating an arrangement of a features calculation section provided in the image data output processing apparatus in FIG. 2.
FIG. 8 is an explanatory drawing illustrating an example of filter coefficients for a mixing filter provided in an MTF process section of the image data output processing apparatus in FIG. 2.

The MTF process section 43 carries out an appropriate filtering process (emphasizing process) so as to recover the blur caused by the MTF deterioration. Further, the MTF process section 43 is used also to suppress a high frequency component that is unnecessary in a later-mentioned feature point extracting process in the subsequent centroid calculation section 45. That is, a mixing filter (not shown) is used to carry out an emphasizing process and a smoothing process. Note that, FIG. 8 illustrates an example of a filter coefficient of the mixing filter.

The binarization process section 44 compares the achromatized image data (a luminance value (luminance signal) or a lightness value (lightness signal)) with a predetermined threshold so as to binarize the image data.

The centroid calculation section 45 carries out labeling with respect to each pixel (labeling process) in accordance with the image data binarized by the binarization process section 44 (for example, the image data is represented by "1" and "0"). The centroid calculation section 45 specifies a connected region in which pixels each having the same label are connected to each other, extracts a centroid of the specified connected region as a feature point, and further, sends the feature point to the features calculation section 32. The feature point can be represented by coordinate value (x-coordinate and y-coordinate) in the binarized image.

The centroid calculation section 45 calculates a feature point (centroid) from a connected region in which the number of pixels exceeds a default threshold value. Meanwhile, in a case where the number of the pixels included in the connected region is less than the default threshold value, the centroid calculation section 45 does not specify the connected region as the one to be subjected to the centroid calculation, and does not carry out the centroid calculation with respect to the connected region. This avoids extracting a feature point from an isolated dot and a noise. On this account, the default threshold value is set to a value (the number of pixels) that is capable of adequately removing an isolated dot and a noise, based on a performance of an image readout apparatus to be used, an image sample to be read out, and the like.

In the present embodiment, in a case where a target document to be matched is not an N-up document, the centroid calculation section 45 determines, by use of the default threshold value, whether or not a connected region is the one to be subjected to the centroid calculation. On the other hand, in a case where the target document is an N-up document, the centroid calculation section 45 determines whether or not a connected region is the one to be subjected to the centroid calculation, by use of a variant threshold value which varies depending on the number of images laid out on the N-up document and a document size of input image data. More details will be described after explanation of a similarity determination process.

Figure 9:
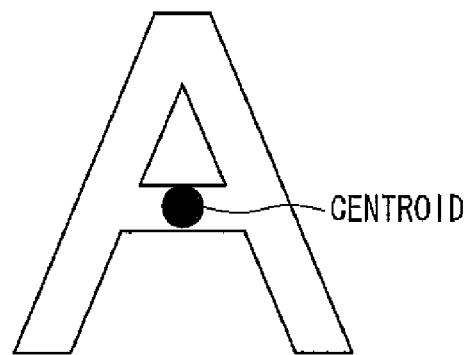
FIG. 9 is an explanatory drawing illustrating an example of a connected region extracted from input image data by the feature point calculation section of the image data output processing apparatus in FIG. 2, and a centroid thereof.
Figure 10:
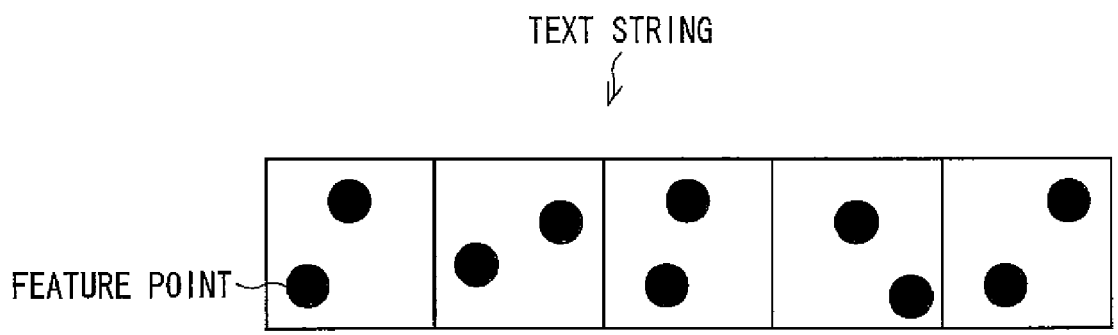
FIG. 10 is an explanatory drawing illustrating an example of each centroid (feature point) of a plurality of connected regions extracted from a text string included in input image data by the feature point calculation section of the image data output processing apparatus in FIG. 2.

FIG. 9 is an explanatory diagram illustrating an example of a connected region extracted from the input image data and a centroid of the connected region. FIG. 9 illustrates a connected region corresponding to a text string "A" and its centroid. FIG. 10 is an explanatory view illustrating an example of centroids (feature points) of plural connected regions extracted from text strings included in the input image data.

In FIG. 5 that is the block diagram schematically illustrating an arrangement of the document matching process section 14, the features calculation section 32 calculates features (hash value and/or invariant) which are invariable relative to geometric transformation such as rotation, parallel shift, scaling up, scaling down, and the like of a document image by use of a feature point calculated by the feature point calculation section 31.

FIG. 7 is a block diagram schematically illustrating an arrangement of the features calculation section 32. As illustrated in FIG. 7, the features calculation section 32 includes a feature point extraction section 32*a*, an invariant calculation section 32*b*, and a hash value calculation section 32*c*.

Figure 11:
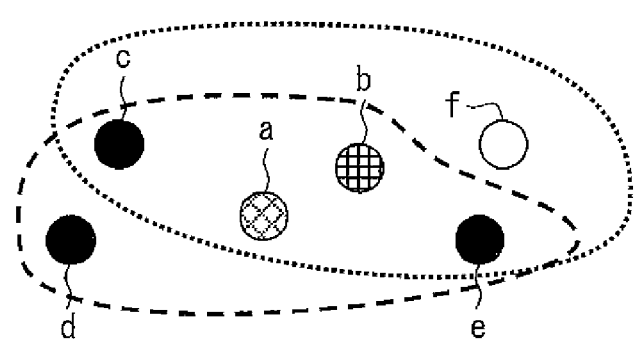
FIG. 11 is an explanatory drawing illustrating an example of a target feature point and peripheral feature points that are extracted at a time when features are calculated by the features calculation section of the image data output processing apparatus in FIG. 2.

As illustrated in FIG. 11, the feature point extraction section 32*a* regards only one feature point as a target feature point and sequentially extracts peripheral feature points around the target feature point in such order that a feature point nearer to the target feature point is more preferentially extracted so as to extract a predetermined number of feature points (four feature points herein). In FIG. 11, four feature points h, c, d, and e are extracted as peripheral feature points in a case where a feature point a is regarded as a target feature point, and four feature points a, c, e, and f are extracted as peripheral feature points in a case where a feature point b is regarded as a target feature point.

Figure 12:
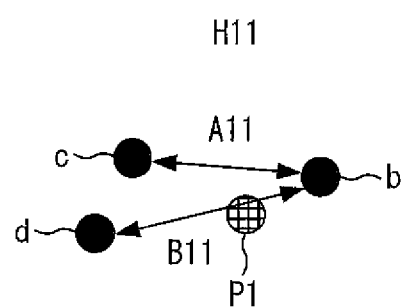
FIG. 12 (*a*) through FIG. 12 (*d*) are explanatory drawings each illustrating an example of a combination of a target feature point and peripheral feature points extracted at a time when the features calculation section of the image data output processing apparatus in FIG. 2 calculates features.
Figure 12:
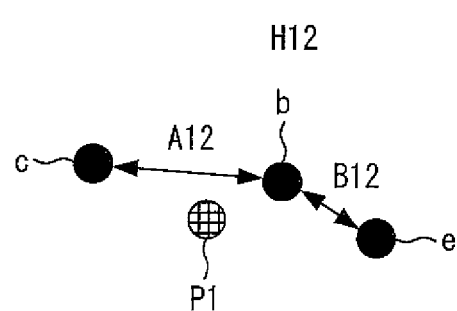
Figure 12:
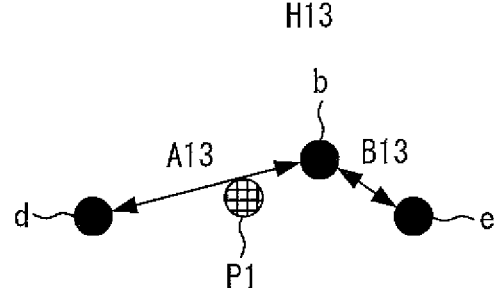
Figure 12:
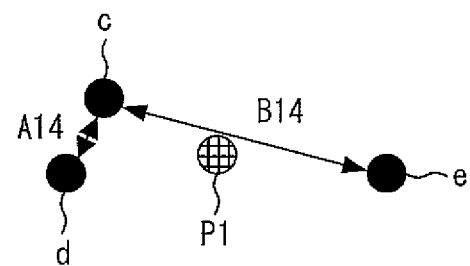

Further, the feature point extraction section 32*a* extracts a combination of three points which can be selected from the four peripheral feature points extracted in the foregoing manner. For example, as illustrated in FIG. 12 (*a*) to FIG. 12 (*d*), in a case where the feature point a in FIG. 11 is regarded as a target feature point P1, a combination of three feature points out of b, c, d, and e, that is, a combination of peripheral feature points b, c, and d, a combination of peripheral feature points b, c, and e, a combination of peripheral feature points b, d, and e, and a combination of peripheral feature points c, d, and e are extracted.

Next, the invariant calculation section 32*b* calculates an invariant (one of features) Hij of the extracted combination relative to geometrical transformation.

Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral feature points is set as the invariant Hij.

The lengths of the lines are calculated in accordance with coordinate values of the peripheral feature points. For example, in FIG. 12 (*a*), when a length of a line connecting the feature point b and the feature point c is A11 and a length of a line connecting the feature point b and the feature point d is B11, the invariant H11 is such that H11=A11/B11.

In FIG. 12 (*b*), when a length of a line connecting the feature point b and the feature point c is A12 and a length of a line connecting the feature point b and the feature point e is B12, the invariant H12 is such that H12=A12/B12. Moreover, in FIG. 12 (*c*), when a length of a line connecting the feature point b and the feature point d is A13 and a length of a line connecting the feature point b and the feature point e is B13, the invariant H13 is such that H13=A13/B13. Further, in FIG. 12 (*d*), when a length of a line connecting the feature point c and the feature point d is A14 and a length of a line connecting the feature point c and the feature point e is B14, the invariant H14 is such that H14=A14/B14. In this manner, the invariants H11, H12, H13, and H14 are calculated in the examples illustrated in FIGS. 12 (*a*) to (*d*).

In the foregoing examples, a line connecting a peripheral feature point first-nearest to the target feature point and a peripheral feature point second-nearest to the target feature point is indicated as Aij and a line connecting a peripheral feature point first-nearest to the target feature point and a peripheral feature point third-nearest to the target feature point is indicated as Bij, but the definition is not limited to this, and the lines used to calculate the invariant Hij may be set in any manner.

Next, the hash value calculation section 32*c* calculates a remainder of the following expression (2):

$$Hi=(Hi1\times10^3+Hi2\times10^2+Hi3\times10^1+Hi4\times10^0)/D \quad (2)$$

as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, calculation of the hash value Hi is not limited to calculating a remainder of the expression (2) and regarding the remainder as the hash value Hi, and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

In FIG. 11, when extraction of peripheral feature points around a feature point a regarded as a target feature point and calculation of a hash value are completed, peripheral feature points around a feature point b regarded as a target feature point are extracted and a hash value is calculated. In FIG. 11, four feature points a, c, e, and f are extracted as peripheral feature points in the case where the feature point b is regarded as a target feature point P2.

Figure 13:
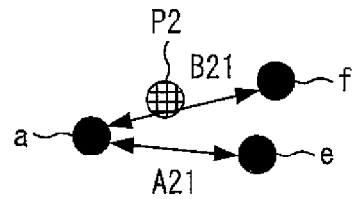
FIG. 13 (*a*) through FIG. 13 (*d*) are explanatory drawings each illustrating a combination of a target feature point and peripheral feature points extracted at a time when the features calculation section of the image data output processing apparatus in FIG. 2 calculates features.
Figure 13:
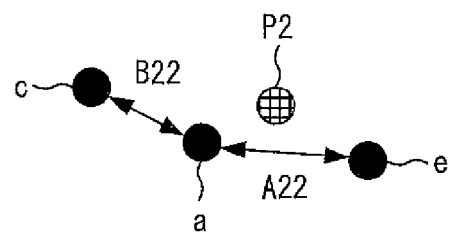
Figure 13:
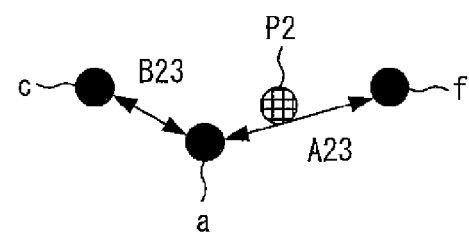
Figure 13:
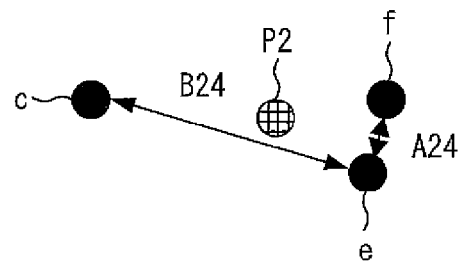

Further, as illustrated in FIGS. 13 (a) to (d), a combination of three points (peripheral feature points a, e, and f, peripheral feature points a, e, and c, peripheral feature points a, f, and c, peripheral feature points e, f, and c) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, in a case of storing the input image data as a reference image, the features calculation section 32 transmits the hash value (features (feature vectors)) calculated in the foregoing manner and corresponding to each feature point of the input image data to the storage process section 35 illustrated in FIG. 5.

The storage process section 35 sequentially stores (i) hash values calculated by the features calculation section 32 and corresponding to the respective feature points and (ii) indices (document IDs) each indicative of a document (input image data) to a hash table (not shown) provided in the memory 8 in such a manner that the hash values and the indices are related to each other (see FIG. 14 (a)). In a case where the hash values have already been stored, the document IDs are stored with them respectively corresponding to the hash values. Document IDs are serially assigned to respective documents without any duplication.

Note that, in a case where the number of documents stored in the hash table is larger than a predetermined value (for example, 80% of the number of documents which can be stored), old document IDs may be searched and sequentially deleted. Further, the deleted document IDs may be reused as document IDs of new input image data. Further, in a case where the calculated hash values are equal to each other (H1=H5 in FIG. 14 (b)), these values may be collectively stored into the hash table.

In a case of determining whether the image of the input image data is identical with an image of a reference image that has been already stored, the features calculation section 32 transmits, to the voting process section 33, the hash value calculated in the foregoing manner and corresponding to each feature point of the input image data.

Figure 15:
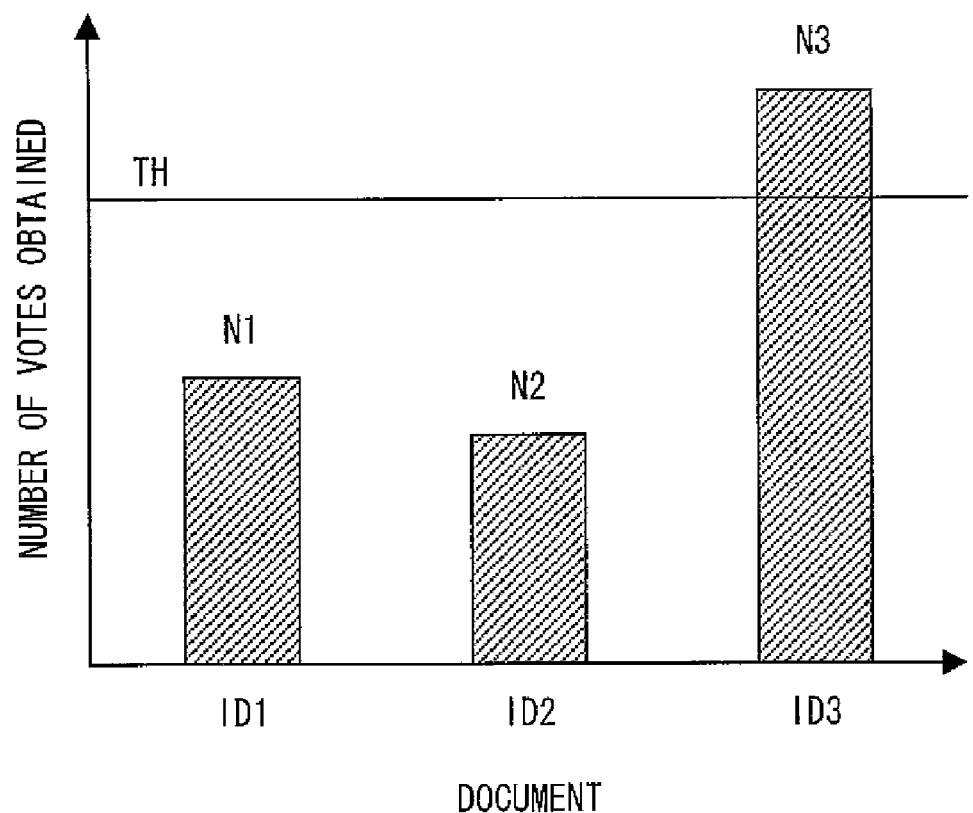
FIG. 15 is a graph showing an example of the number of votes for each reference image in a voting process section of the image data output processing apparatus in FIG. 2.

The voting process section 33 compares the hash value calculated from the input image data and corresponding to each feature point with the hash value stored in the hash table so as to vote for a reference image having the same hash value (see FIG. 15). FIG. 15 is a graph illustrating an example of the number of votes for reference images ID1, ID2, and ID3. In other words, the voting process section 33 counts, with respect to each reference image, how many times the same hash value as a hash value of the reference image is calculated from the input image data, and the counted number is stored in the memory 8.

Further, in FIG. 14 (b), H1 is equal to H5, and these hash values are collectively stored into the hash table as H1. In such a table value, in a case where hash values of the input document calculated from the input image data includes H1, the document ID1 obtains two votes.

The similarity determination process section 34 reads out a vote result of the voting process section 33 (an index of each reference image and the number of votes for each reference image) from the memory 8, and extracts the maximum number of votes obtained and an index of a reference image with the maximum number of votes obtained.

Further, the similarity determination process section 34 compares the maximum number of votes obtained, that indicates similarity, with a predetermined threshold value TH so as to determine whether there is any similarity or not (whether the input image data is identical with image data of the reference image or not). That is, in a case where the maximum number of votes obtained is not less than the predetermined threshold value TH, it is determined that "there is a similarity", and in a case where the maximum number of votes is less than the threshold value, it is determined that "there is no similarity".

The similarity determination process section 34 then sends a determination signal indicative of the determination result to the control section 7. In the case where there is a similarity, the control section 7 supplies a control signal to control an output process, for example, prohibiting an output process (an image forming process in the color copying machine) with respect to the image data of the input document, or degrading an image quality.

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH (80% of the number of total votes for example) to determine the similarity.

Further, it may be so arranged that: the similarity determination process section 34 divides the number of votes obtained for each reference image by the number of times of storing a hash value (maximum number of times a hash value is stored) corresponding to a reference image whose hash value is most frequently stored and normalizes the result so as to calculate the similarity, thereby comparing the similarity with the predetermined threshold value TH (80% of the number of total votes for example) to determine the similarity.

That is, in a case where the calculated similarity is not less than a threshold value TH, it is determined that "there is a similarity", and in a case where the calculated similarity is less than the threshold value TH, it is determined that "there is no similarity". Note that, in this case, the total number of hash values extracted from the input image data may be larger than the maximum number of times of storing a hash value (particularly, a case where the document and/or the reference image partially has a handwritten part), so that the calculated value of the similarity may exceed 100%.

Further, the threshold value TH in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper currency or the like. In this manner, the importance may be set by stages according to each reference image.

In this case, a weighting coefficient according to importance of a reference image is stored in the memory 8 with the weighting coefficient corresponding to an index of the reference image, and the similarity determination process section 34 determines the similarity by using the threshold value TH corresponding to the reference image with the maximum number of votes obtained.

Further, it may be so arranged that: in determining the similarity, the threshold value TH is made constant and the number of votes for each reference image (the number of votes obtained for each reference image) is multiplied by a weighting coefficient of each reference image so as to determine the similarity.

In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes.

For example, a maximum corrected number of obtained votes may be compared with the threshold value TH, or a value obtained by normalizing the maximum corrected number of obtained votes by the number of total votes may be compared with the threshold value TH, or a value obtained by normalizing the maximum corrected number of obtained votes by the maximum number of times of storage may be compared with the threshold value TH. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

Next, explained is the centroid calculation section 45 provided in the feature point calculation section 31 in detail. In a conventional image matching apparatus, a threshold value as a criterion for determining whether or not a connected region is the one to be subjected to features calculation is fixed to a default threshold value. The default threshold value is a value that is capable of removing an isolated dot and a noise in image data of a reference document.

From this reason, in a case where an image of an N-up document, a reduced-size document, or the like is reduced in size from its original image, when a connected region is extracted by use of the same threshold value as the reference document, in a part in which the number of pixels actually exceeds the threshold value and which should be extracted as a connected region, the number of pixels cannot exceed the threshold value because the image is reduced in size, thereby resulting in that the part is not extracted as the connected region. Consequently, the number of feature points decreases and features differ, thereby decreasing accuracy in determination.

In view of this, in the present embodiment, as has been already described, in the case where a target document to be matched is not an N-up document, the centroid calculation section 45 determines, by use of the default threshold value, whether or not a connected region is the one to be subjected to the centroid calculation, in a similar manner to the conventional apparatus. On the other hand, in the case where the target document is an N-up document, the centroid calculation section 45 determines whether or not a connected region is the one to be subjected to the centroid calculation, by use of a variant threshold which varies depending on the number of images laid out on the N-up document and a document size of input image data.

Figure 1:
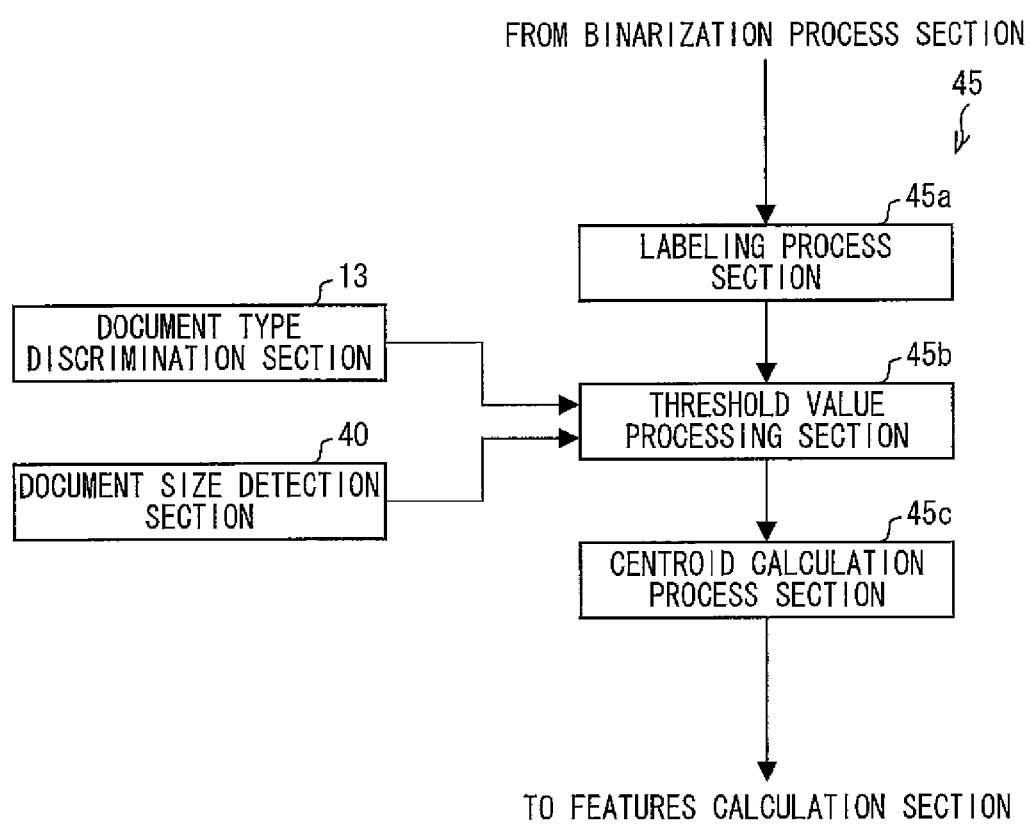
FIG. 1 is a block diagram schematically illustrating an arrangement of a centroid calculation section of a document matching process section provided in an image data output processing apparatus as a digital color copying machine according to one embodiment of the present invention.

FIG. 1 is a block diagram schematically illustrating an arrangement of the centroid calculation section 45. The centroid calculation section 45 includes: a labeling process section (a connected region specifying section) 45*a*, a threshold value processing section 45*b*, a centroid calculation process section (a feature point calculation process section) 45*c*. Note that processes in each section can be carried out by use of a method disclosed in Japanese Patent Application, Tokugan, No. 2006-126761.

The labeling process section 45*a* carries out labeling with respect to a target pixel to be labeled by referring to labels assigned to adjacent pixels. A labeling process in the labeling process section 45*a* is described below with reference to FIGS. 16 through 19.

Figure 16:
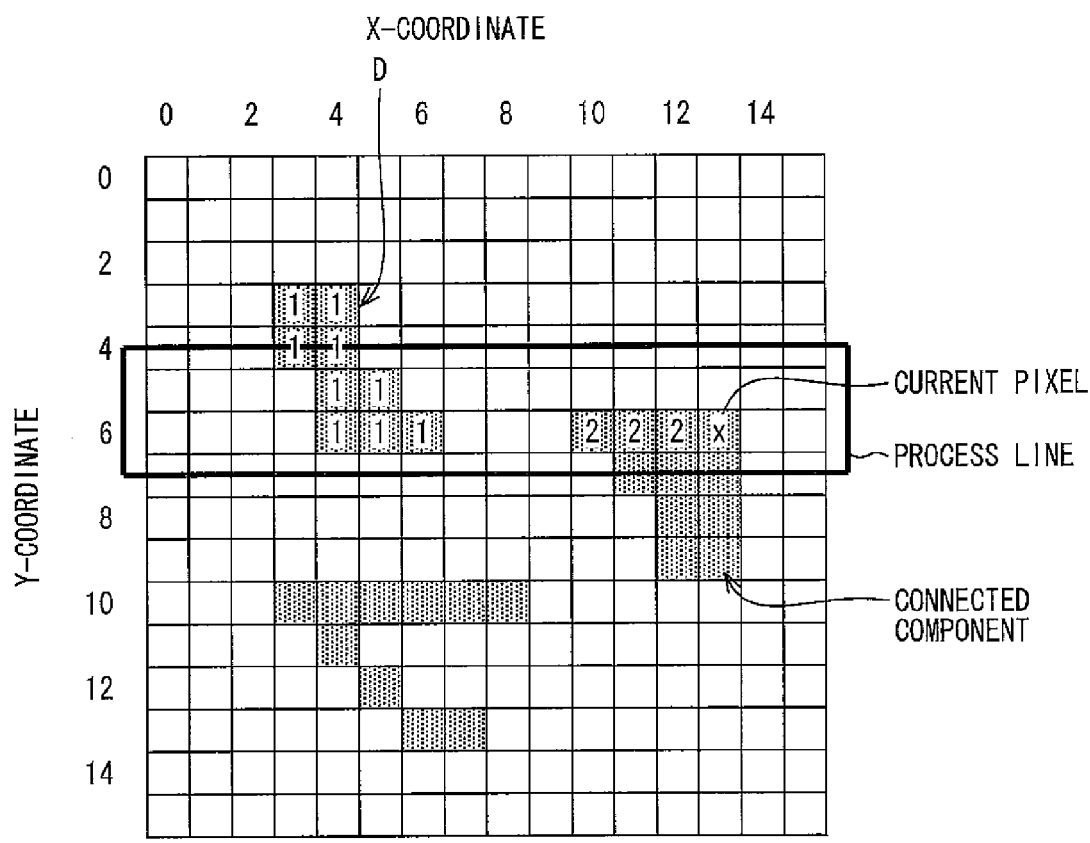
FIG. 16 (*a*) is an explanatory view illustrating a labeling process in a labeling process section of a centroid calculation section provided in the image data output processing apparatus illustrated in FIG. 2, and FIG. 16 (*b*) is an explanatory view illustrating a process of adding coordinate values of target pixels to be labeled to a buffer for accumulating coordinate values, in regard to each label, in the labeling process section.
Figures 17, 18:
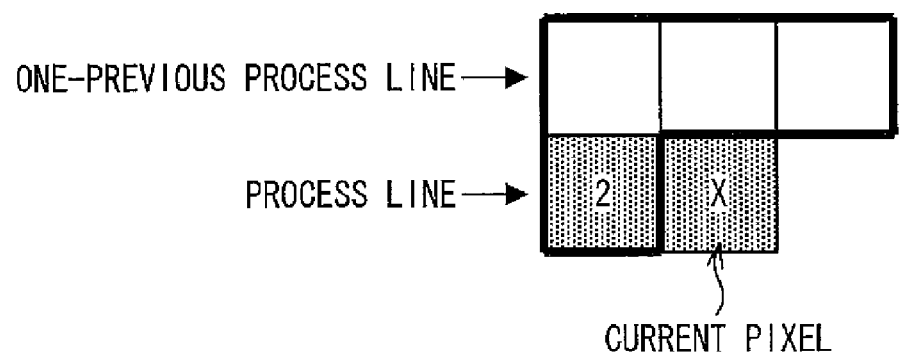
FIG. 17 is an explanatory view illustrating four pixels that are adjacent to a current pixel X and determines which label is assigned to the current pixel X, in the labeling process in the labeling process section of the centroid calculation section provided in the image data output processing apparatus illustrated in FIG. 2.
FIG. 18 is an explanatory view illustrating a merging process that is carried out when different labels are assigned to the four pixels, which are adjacent to the current pixel X and determines which label is assigned to the current pixel X in the labeling process in the labeling process section of the centroid calculation process provided in the image data output processing apparatus illustrated in FIG. 2.

As illustrated in FIG. 16 (*a*), a label buffer having two lines holds labels of pixels in one-previous line and labels of pixels in a current line. Then, as illustrated in FIG. 17, labeling is carried out with respect to a current pixel X by referring labels of four adjacent pixels that are adjacent to the current pixel X and placed in an L shape.

When all of the four pixels adjacent to the current pixel X are not labeled, a label that is not used is assigned to the current pixel X. On the other hand, when the four pixels adjacent to the current pixel X have the same label, the same label as the four pixels is assigned to the current pixel X.

Further, when the four pixels adjacent to the current pixel X have different labels, the oldest label among the labels is assigned to the current pixel X (merge). In this case, these labels are recorded in a label equivalent table as the same value (see FIG. 18).

According to the process, in the case of the example of FIG. 16 (*a*), a label of the current pixel X is "2".

While carrying out labeling, the labeling process section 45*a* adds coordinate values of target pixels to be labeled to a buffer for accumulating coordinate values according to each label, as illustrated in FIG. 16 (*b*).

Explained is a nine-pixel region D in which a label "1" is assigned to each pixel, illustrated in FIG. 16 (*a*), as an example.

Accumulated values of X-coordinate and Y-coordinate in the nine-pixel region D are as follows:
  X-coordinate: (3+4)+(3+4)+(4+5)+(4+5+6)=38
  Y-coordinate: (3+3)+(4+4)+(5+5)+(6+6+6)=42.
Accordingly, a centroid is such that:
  X-coordinate: 38/9 nearly equal to 4.22
  Y-coordinate: 42/9 nearly equal to 4.67.
With respect to the label "2", FIG. 16 (*b*) shows a result of three pixels that have been already labeled.

In a case where the adjacent pixels have different labels, the labeling process section 45*a* carries out a merging process in which coordinate values that are accumulated respectively in two labels are added to the buffer so that two labels are merged.

Further, each label has a flag, and when the process is completed with respect to one line, the labeling process section 45*a* checks whether coordinate values have been added to the buffer or not. As a state of the flag, there are three states: "empty", "processed", and "not processed". The "empty" is a state where a label is not used. When a label is assigned to a current pixel, a flag of the label is changed to the "processed". Further, in a case where the label "1" has been used but not used in a current line at a time when the process is completed with respect to the current line, the "processed" state is changed to the "not processed" state. Every time when the process starts with respect to a line, the labels are initialized (a label that is not used is initialized as the "empty", and a label that has been used is initialized as "processed").

The threshold value processing section 45b (i) compares the number of pixels included in connected regions specified by the labeling process section 45a with a threshold value, (ii) extracts a connected region in which the number of the pixels exceeds the threshold value, from the connected regions thus specified, and (iii) sends the connected region thus extracted to the centroid calculation process section 45c. The centroid calculation process section 45c calculates a centroid of the connected region received from the threshold value processing section 45b, as described later.

In the present embodiment, in a case where a target document to be matched is determined as an N-up document by the document type discrimination section 13, the threshold value processing section 45b uses, instead of the default threshold value, a variant threshold value which varies depending on the number of images laid out on the target document and its document size.

Here, the number of images laid out on an N-up document is detected by the document type discrimination section 13, and a document size is detected by the document size detection section 40, as has been already described. The document size detection section 40 may adopt, for example, a method of detecting, in main and sub scanning directions, a size of a document placed on a scanner platen by use of a photoelectronic conversion element such as a phototransistor provided in the color image input apparatus 2, or a method in which a control section detects a document size selected by a user from the operation panel 6.

FIG. 19 shows one example of the variant threshold value. Here, an A4-size reference image data is set to a resolution of 300 dpi. The variant threshold value is expressed as a function of the default threshold value, and a multiplier coefficient Z is set so as to vary depending on a document size of an N-up document and the number of images laid out thereon.

The multiplier coefficient Z is a value corresponding to a reduction ratio from an original image size. For example, in a case where a document size of input image data is A4 and the number of images laid out on the input image data is 2 (2-in-1 document), the two document images laid out on the input image data are respectively reduced about 0.7 times from their original image sizes. Accordingly, the multiplier coefficient Z is set to 0.7, and the variant threshold value is such that the default threshold value×0.7.

With the arrangement, the criterion for determining whether or not the centroid calculation is carried out with respect to a specified connected region is reduced in conformity to a reduction ratio of the target document, so that the threshold value is set so as to varies depending on the reduction ratio of the target document. This solves trouble in which a feature point is not easily extracted in an N-up document, thereby improving accuracy in matching.

Further, in the example of FIG. 19, in a case where a document size of input image data is A3 and the number of images laid out on the input image data is 2 (2-in-1 document), each size of the two document images laid out on the input image data is equal to A4 size, i.e., their original document size. Accordingly, in this case, the default threshold value can be used, that is, the multiplier coefficient Z is 1.

Furthermore, for example, in a case where a document size of input image data is A3 and the number of images laid out on the input image data is 8 (8-in-1 document), each size of the eight document images laid out on the input image data is reduced about 50% from A4 size, i.e., their original document size. Accordingly, the multiplier coefficient Z is set to 0.5, and the variant threshold value is such that the default threshold value×0.5.

In the present embodiment, even in a case where a target document to be matched is not an N-up document, when a document size of the target document is smaller than a document size of a reference document according to a detection result of the document size detection section 40 (i.e., a case where a document image is considered to be reduced), the threshold value processing section 45b may use, instead of the default threshold value, the variant threshold value which varies depending on its reduction ratio.

For example, in a case where an A4-size reference document is set to a resolution of 300 dpi, when a document size of input image data is A5, it is assumed that its document image is reduced 70%, similarly to a 2-in-1 document. In this case, the variant threshold value that is set such that the default threshold value×0.7 may be used.

The centroid calculation process section 45c calculates a centroid by dividing accumulated coordinate values by the number of pixels. In regard to a label for which no coordinate values are added to the buffer at the time when the process with respect to one line has been completed, a connected component of the label does not further continue in the subsequent lines. From this reason, the centroid calculation process section 45c calculates a centroid of the connected region by dividing accumulated coordinate values by the number of pixels. After the calculation, the label is initialized.

In calculating a centroid, the centroid calculation process section 45c calculates a centroid with respect to a connected region in which the number of pixels exceeds the default threshold value or the variant threshold value, in accordance with the threshold value processing result by the threshold value processing section 45b.

Figure 20:
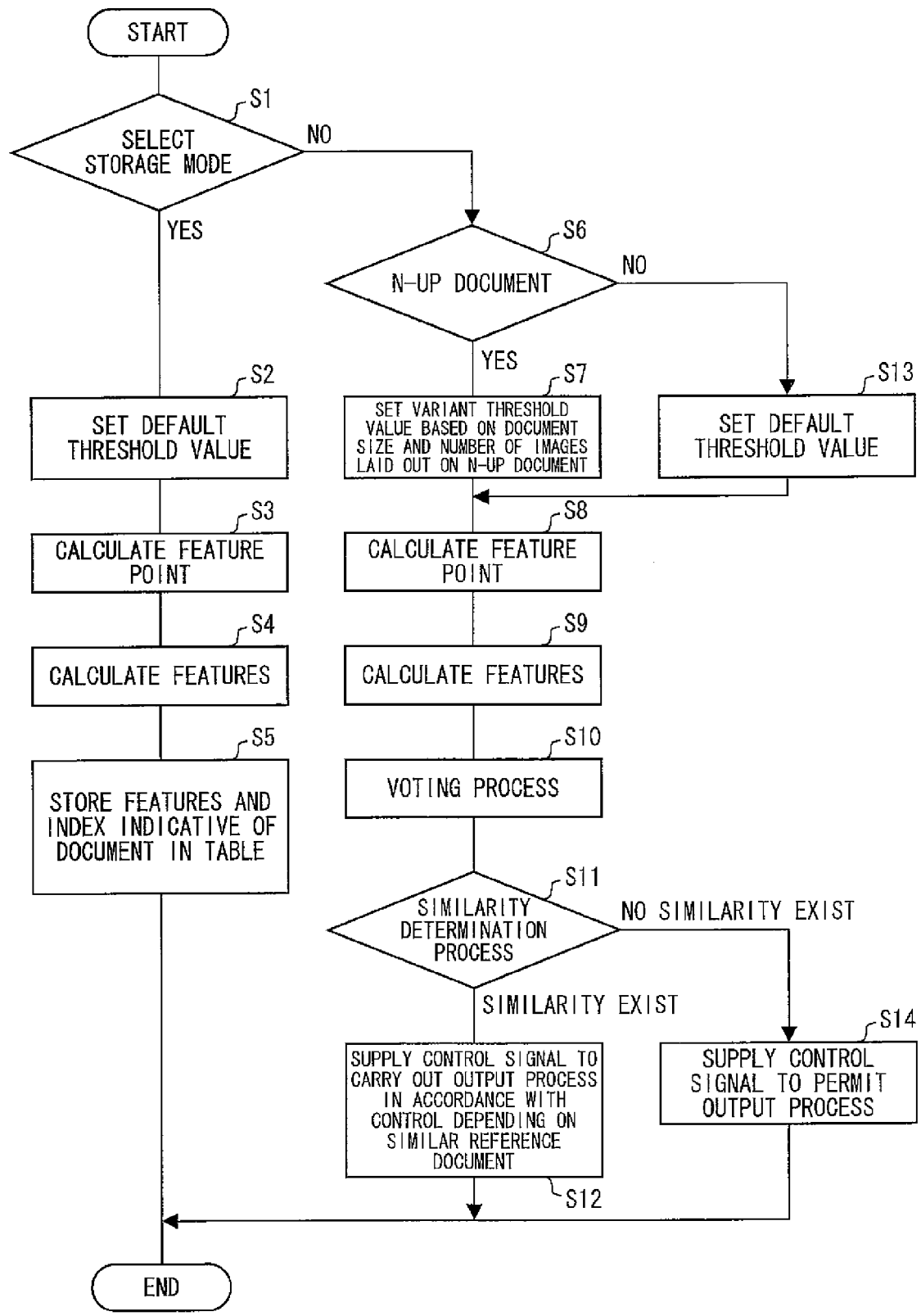
FIG. 20 is a flowchart illustrating a flow of a similarity determination process in the image data output processing apparatus in FIG. 2.

The following explains a similarity determination process in the digital color copying machine 1 with reference to the flowchart in FIG. 20.

Upon receiving an instruction input entered by a user from the operation panel 6, the control section 7 determines whether a storage mode is selected or not (S1). In a case where the storage mode is selected, input image data is stored.

Firstly, the control section 7 controls each section of the document matching process section 14 so as to leave the threshold value as a default threshold value, which is a criterion for determining whether or not a centroid of a connected region is calculated (S2), and cause a threshold value process at the default threshold value for calculating a feature point (S3), sequentially, a features calculation process (S4), and a document ID storage process (S5).

On the other hand, in a case where it is determine that the storage mode is not selected, that is, a matching mode is selected in S1, it is determined whether a target document to be matched is an N-up document or not (S6). When it is determined that the target document is not an N-up document in S6, the control section 7 controls each section of the document matching process section 14 so as to leave the threshold value as the default threshold value, which is the criterion for determining whether or not a centroid of a connected region is calculated, similarly to the storage mode (S13), and cause a threshold value process at the default threshold value for calculating a feature point (S8). When it is determined that the target document is an N-up document in S6, the control section 7 controls each section of the document matching process section 14 so as to change the threshold value, which is the criterion for determining whether or not a centroid of a connected region is calculated, to a variant threshold value that varies depending on a document size of the target document and the number of images laid out on the N-up document (S7), and cause a threshold value process for calculating a feature point, by use of the variant threshold value that varies depending on the document size and the number of the images laid out on the N-up document (S8).

Then, on the basis of the feature point calculated in S8, a features calculation process (S9), a voting process (S10), and a similarity determination process (S11) are carried out. When it is determined that there is a similarity in S11, the control section 7 supplies a control signal so that an output process is carried out with respect to the input image data in accordance with a control on the reference document similar to the target document (the input image data) (S12).

As described above, in the digital color copying machine 1 of the present embodiment, in the case where the input image data is an N-up document in the matching mode, the centroid calculation section 45 in the feature point calculation section 31 carries out the threshold value process by changing a threshold value as the criterion for determining whether or not a centroid of a connected region is calculated to the variant threshold value that varies depending on a document size of the N-up document and the number of images laid out thereon, in other words, a variant threshold value which varies depending on a reduction ratio of each document image, and which can be calculated from the document size and the number of the images laid out on the N-up document.

Moreover, when it is determined that the input image data is the one of a reduced-size document in the matching mode, the centroid calculation section 45 in the feature point calculation section 31 carries out the threshold value process by changing a threshold value as the criterion for determining whether or not a centroid of a connected region is calculated to the variant threshold value which varies depending on a reduction ratio of the reduced-size document, and which can be calculated from a document size of the target document and a document size of a reference document.

With the arrangement, even when a target document to be matched is an N-up document and images laid out thereon are reduced in size, or the target document is a reduced-size document, a threshold value as the criterion for determining whether or not a centroid of a connected region is calculated is set to a threshold value which varies depending on a reduction ratio of the target document. This can improve accuracy in matching in an N-up document.

Figure 21:
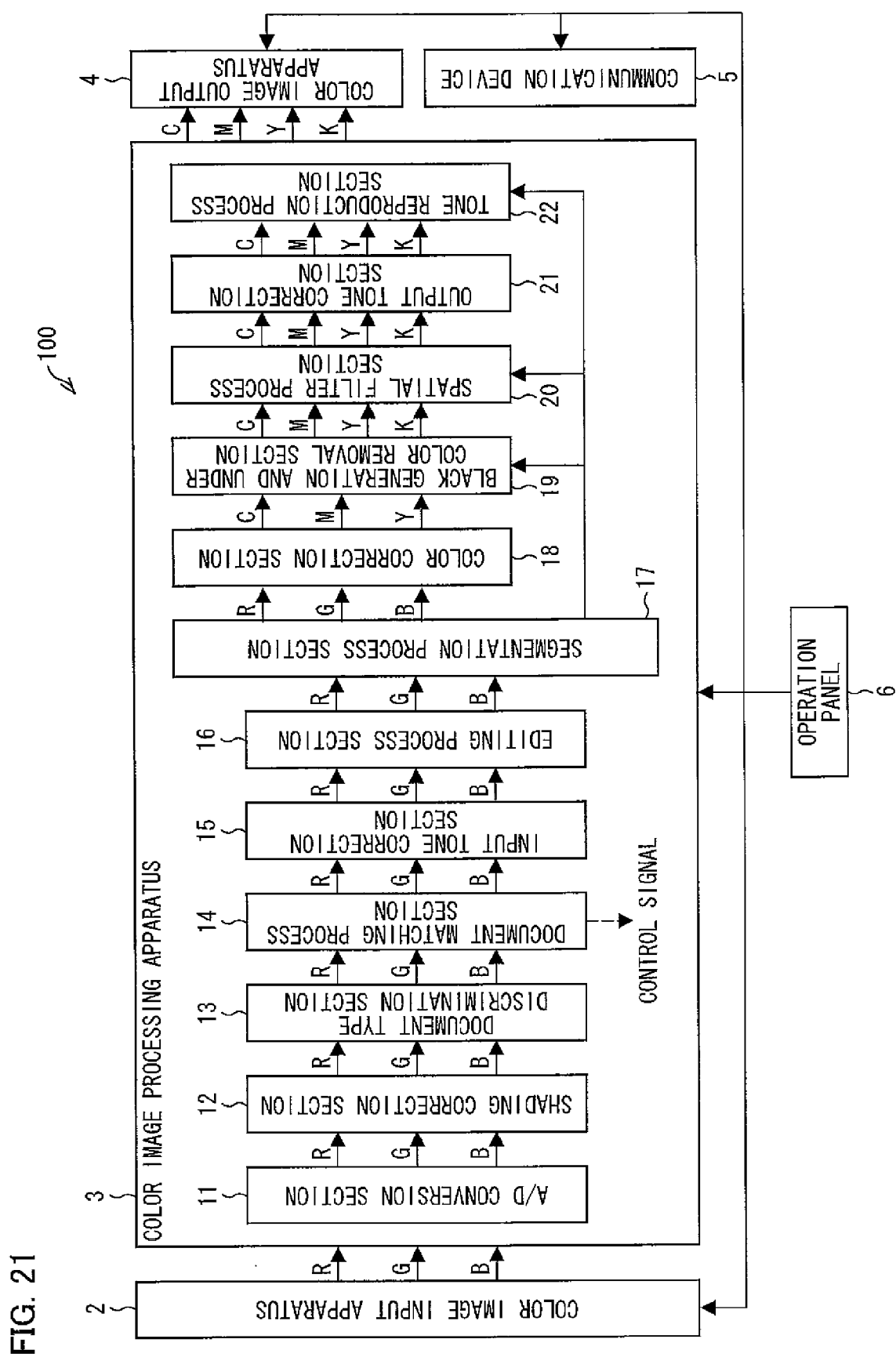
FIG. 21 is a block diagram schematically illustrating an arrangement of an image data output processing apparatus as a digital color multi-function printer according to another embodiment of the present invention.

Further, although this embodiment deals with a case where the present invention is applied to the digital color copying machine 1, the target apparatus to which the present invention is applied is not limited to the above apparatus, and may be, for example, a digital color multi-function printer (MFP) 100, as illustrated in FIG. 21. The digital color multi-function printer 100 has functions such as a copying function, a printer function, a facsimile function, a scanner function, and a scan to e-mail function.

In FIG. 21, members having the same functions as those in the digital color copying machine 1 have the same referential numerals, and are not described here.

Here, a communication device 5 is constituted by, for example, a modem and a network card. The communication device 5 performs a data communication with other devices connected to a network (e.g., a personal computer, a server, other digital multi-function printer, a facsimile device) via a network card, a LAN cable, or the like.

In transmitting image data, the communication device 5 (i) ensures a transmittable state by carrying out a transmission procedure with a destination device, (ii) reads out image data compressed in a predetermined format (image data scanned by a scanner) from a memory, (iii) carries out necessary processes such as a conversion of a compression format with respect to the image data, and (iv) sequentially transmits the image data to the destination device via a communication line.

Further, in receiving image data, while carrying out a communication procedure, the communication device 5 receives image data transmitted from an originating communication device, and sends the image data to a color image processing apparatus 3. The image data thus received by the color image processing apparatus 3 is subjected to predetermined processes such as a decompression process, a rotating process, a resolution conversion process, an output tone correction, and a tone reproduction process. The image data thus processed is outputted by a color image output apparatus 4. Further, it may be so arranged that the received image data is stored in a storage device (not shown), and the color image processing apparatus 3 reads out the image data as required and carries out the predetermined processes with respect to the image data.

In the multi-function printer 100, a user can input, from an operation panel 6, a processing request (e.g., a processing mode (copy, printing, transmission, editing and the like), the number of images to be processed (the number of images to be copied, the number of images to be printed out), a destination of input image data, and the like) with respect to the image data. In a case where it is determined that there is a similarity, a control section 7 controls a document matching process section 14 in regard to not only a copying process, but also output processes such as printing, transmission, editing and the like.

For example, in a case where a facsimile transmission mode is selected, when the document matching process section 14 determines prohibition of an output of input image data, the image data stored in a memory is deleted and a facsimile transmission of the image data is not carried out. Alternatively, in a case where, even though the input image data is identical with a reference document, a facsimile transmission of the image data is permitted (a document ID and a destination of the image data are stored in advance so as to be related to each other), the image data may be transmitted by referring to information of the destination.

Figure 22:
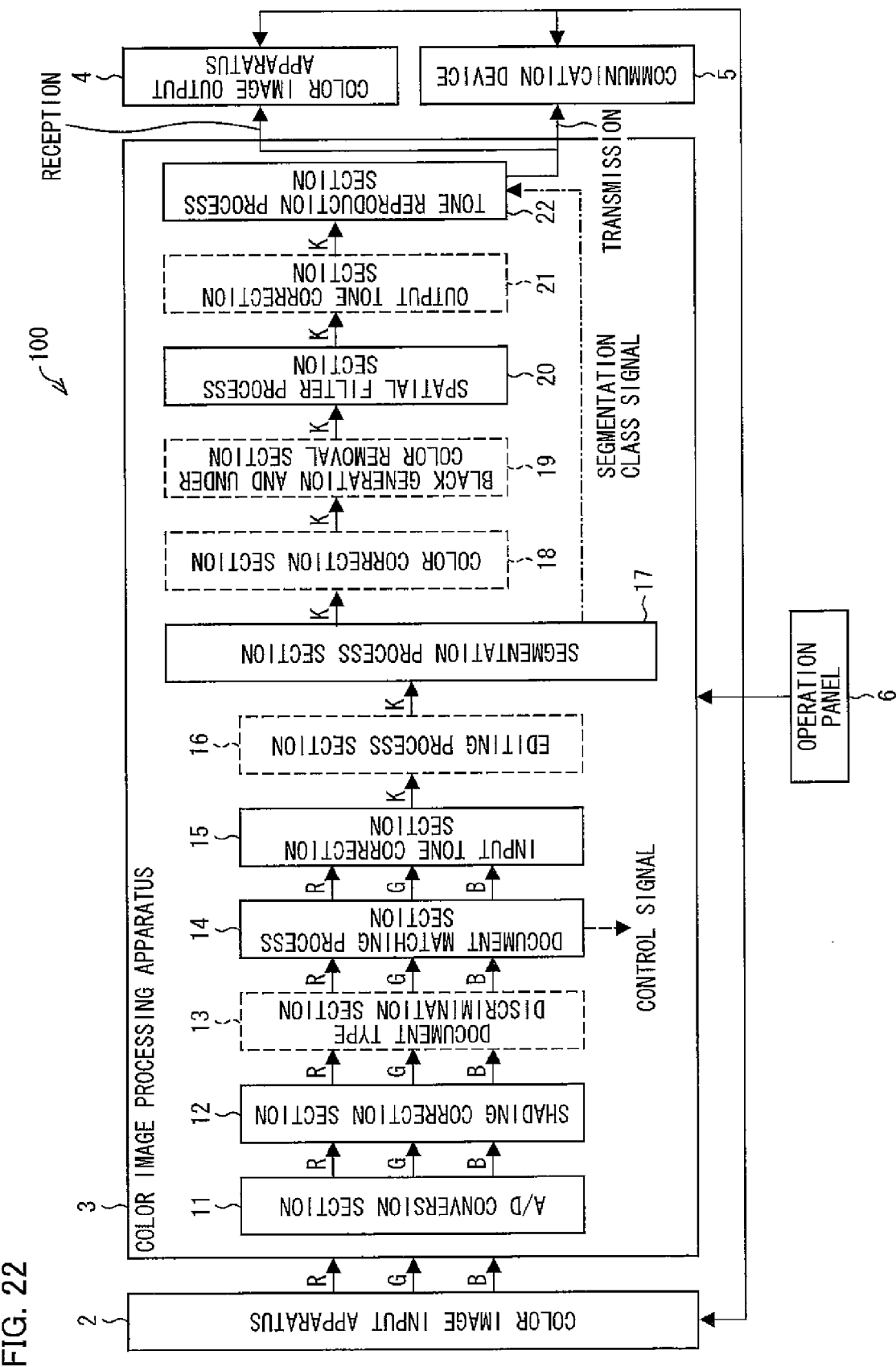
FIG. 22 is an explanatory drawing illustrating a flow of image data in a facsimile process in the image data output processing apparatus in FIG. 21.

A facsimile process in the digital color multi-function printer 100 is explained with reference to FIG. 22. In FIG. 22, process sections that do not carry out a process are illustrated in dot lines. In this embodiment, a segmentation process section 17 is used in the facsimile process. However, the segmentation process section 17 is not necessarily required in the facsimile process. Further, in facsimile transmission, a resolution conversation section and a compression/decompression process section carry out each process after a tone reproduction section 22.

In transmission of input image data, for example, 8-bit input image data loaded by a color image input apparatus 2 is subjected to each of the aforementioned processes in a color image processing apparatus 3, and RGB signals of the input image data thus processed are converted into a luminance signal (a K signal in FIG. 22), for example, by a matrix calculation or the like, in an input tone correction section 15. The image data thus converted into the format of the luminance signal is then subjected to predetermined processes in a segmentation process section 17 and a spatial filter process section 20, and binarized, for example, by an error diffusion process in a tone reproduction section 22. The image data thus binarized is then subjected to a rotating process as needed, compressed into a predetermined format in the compression/decompression process section, and stored in a memory (not shown).

When a communication device (e.g., a modem) 5 carries out a transmission procedure with a destination device so as to ensure a transmittable state, the image data compressed in the predetermined format is read out from the memory, subjected to necessary processes such as a conversion of the compression format, and sequentially transmitted to the destination device via a communication line.

On the other hand, in reception of image data, when an image is transmitted from an originating communication device via a communication line, while carrying out the communication procedure, a control section receives the image transmitted from the originating communication device. Thus received image data compressed in a predetermined format is sent to the color image processing apparatus 3.

The compression/decompression process section decompresses the image data thus received in the color image processing apparatus 3 so that the document image received as a page image is reproduced. Thus reproduced document image is then subjected to a rotating process depending on a capability of a color image output apparatus and is then subjected to a resolution conversion process in a resolution conversion section. Finally, the color image output apparatus outputs the image data reproduced as an image per page.

The above explanation deals with a case of processing monochrome image data as an example, but the present invention is not limited to this. For example, image data may be also processed by use of a color image processing apparatus that includes, between the segmentation process section 17 and the spatial filter process section 20, (i) a color correction section 18 that carries out, with respect to RGB signals loaded by the color image input apparatus 2, a process of removing color impurity on the basis of spectral characteristics of CMY (C: Cyan, M: Magenta, and Y: Yellow) color materials of toner or ink that include an useless absorption component, in order to realize a faithful color reproduction, and (ii) a black generation and under color removal section that carries out (a) a black generation process for generating a black (K) signal from three color (CMY) signals after the color correction process and (b) a generation process of new CMY signals by removing the K signal obtained by the black generation process from the original CMY signals.

Further, in the case of the digital color copying machine 1, input image data is the one scanned and inputted from a document by a scanner. However, in the digital color multi-function printer 100, the input image data encompasses image data that is scanned and inputted from a document by a scanner, and electronic data formed by use of a computer (software), e.g., electronic data formed by filling in a form with necessary information by use of a computer (software). In view of practical use, there are two types of the electronic data: (i) paper-based data that is scanned and filed, and (ii) data that is formed as electronic data directly (an electronic application and the like).

Moreover, as to electronic data of an N-up document, a setting of an N-up document may be carried out by application software, or alternatively N-up printing may be set on a setting screen of a printer driver. In either case, image data is converted into PDL (page description language) and developed into bitmap data at a time when the image data is received in the digital color multi-function printer 100. Accordingly, it is possible to determine whether the bitmap data is an N-up document or not in the similar manner to the similarity determination with respect to image data inputted by a scanner.

In the arrangement of FIG. 21, a similarity determination process is carried out in a document matching process section 14 provided in the digital color multi-function printer 100. However, the present invention is not limited to this. For example, a part of or all functions that the control section 7 and the document matching process section 14 have may be carried out in an external apparatus, which is connected to the digital color multi-function printer 100 so that the external apparatus be communicated with the digital color multi-function printer 100.

Furthermore, the present invention may be applied, for example, to a monochrome multi-function machine. Further, the present invention may be applied not only to multi-function machines, but also to a facsimile communication apparatus, a copying machine, an image readout apparatus, and the like.

Figure 23:
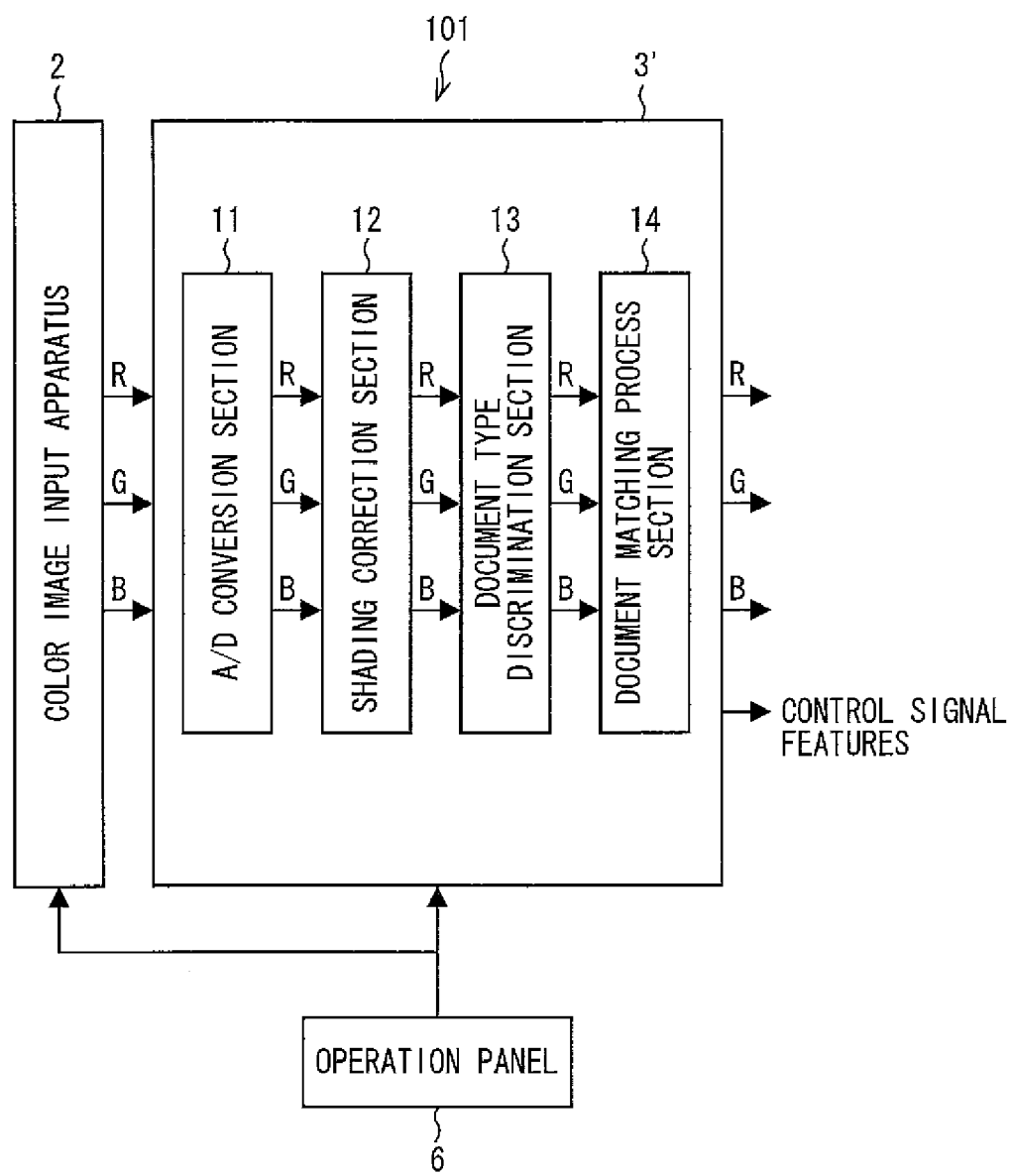
FIG. 23 is a block diagram schematically illustrating an arrangement of an image data output processing apparatus according to further another embodiment of the present invention.

For example, FIG. 23 is a block diagram illustrating an exemplary arrangement of a flat bed scanner 101 to which the present invention is applied.

As illustrated in FIG. 23, a flat bed scanner 101 includes a color image input apparatus 2, and a color image processing apparatus 3'. The color image processing apparatus 3' includes an A/D conversion section 11, a shading correction section 12, a document matching process section 14, a control section (not shown in FIG. 23), and a memory (not shown in FIG. 23), and the color image input apparatus 2 is connected thereto. As such an image data output processing apparatus is formed. Note that, the A/D conversion section 11, the shading correction section 12, the document matching process section 14, the control section 7, and the memory 8 in the color image input apparatus (image readout means) 2 respectively have almost the same functions as those in the digital color copying machine 1, and are not described here in detail.

Each section (each block) constituting the document matching process section and the control section included in the digital color copying machine 1, the multi-function printer 100, or the flat bed scanner 101 may be realized by software with the use of a processor such as a CPU. Namely, the digital color copying machine 1, the digital color multi-function printer 100, or the flat bed scanner 101 includes: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color copying machine 1, the digital color multi-function printer 100, or the flat bed scanner 101 is provided with a computer-readable storage medium for storing program codes (such as executable program, intermediate code program, and source program) of programs of the digital color copying machine 1, the digital color multi-function printer 100, or the flat bed scanner 101 includes which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color copying machine 1, the multi-function printer 100, or the flat bed scanner 101 may be arranged so as to be connectable to a communication network so that the program code is supplied to the digital color copying machine 1, the multi-function printer 100, or the flat bed scanner 101 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color copying machine 1, the multi-function printer 100, or the flat bed scanner 101 is not limited to the one that is realized by use of software, and may be realized by hardware logic. Each block of the digital color copying machine 1, the multi-function printer 100, or the flat bed scanner 101 may be a combination of hardware carrying out some of the processes and the computing means controlling the hardware and executing program code for the other processes.

The computer system of the present invention may include: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

As described above, a first image matching apparatus of the present invention includes: a features extraction section for extracting features of an image from input image data, the features extraction section extracting the features based on a connected region in which pixels in a binarized image of the image data are connected to each other and the number of the pixels exceeds a default threshold value, the apparatus (i) causing the features extraction section to extract the features from input image data of a target document to be matched, and (ii) determining whether or not the target document has a similar image to that of a preliminarily stored reference document based on a comparison of the features thus extracted with features of the image of the reference document. The apparatus, further includes: an N-up document determination section that determines (i) whether or not the target document is an N-up document on which plural documents are laid out, and (ii) the number of images laid out on the N-up document when it is determined that the target document is an N-up document; and a document size detection section that detects a document size of the target document, when the N-up document determination section determines that the target document is an N-up document, the features extraction section extracting the features, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

Image data that is inputted into the image matching apparatus includes: image data that is scanned and inputted by a scanner; and further, electronic data formed by use of a computer (software), e.g., electronic data that is formed by filling in a form of the electronic data with necessary information by use of a computer (software).

With the arrangement, even when the target document is an N-up document and images thereof are reduced in size, a threshold value that is used for extracting a connected region to be subjected to features calculation is the variant threshold value that varies depending on the document size and the number of the images laid out on the N-up document, that is, a threshold value that varies depending on a reduction ratio of the target document, thereby improving accuracy in matching in an N-up document.

In the first image matching apparatus of the present invention, the features extraction section can include: a connected region specifying section that specifies a connected region in which pixels in a binarized image are connected to each other; a threshold value processing section that extracts a connected region in which the number of pixels exceeds a threshold value, based on a comparison of the number of pixels included in the connected region thus specified by the connected region specifying section with the threshold value; a feature point calculation process section that calculates a feature point of the connected region extracted by the threshold value processing section; and a features calculation section that calculates features of an image by use of the feature point calculated by the feature point calculation process section, when it is determined that the target document is an N-up document, the threshold value processing section using, as the threshold value, the variant threshold value which varies depending on the number of the images laid out on the target document and the document size, instead of the default threshold value.

A first image data output processing apparatus of the present invention that carries out an output process with respect to image data, includes: the first image matching apparatus of the present invention; and an output process control section that controls an output process with respect to image data of the target document in accordance with a determination result of the image matching apparatus.

As described above, the first image matching apparatus of the present invention can determine a similarity with high accuracy, even in a case where the target document is an N-up document and images thereof are reduced in size from their original size.

Accordingly, in a case where an image of image data to be subjected to the output process is similar to that of a reference document, the image data output processing apparatus including such the image matching apparatus can control an output process with high accuracy. This can increase reliability.

An image matching method of the present invention includes the step of: (a) extracting features of an image from input image data based on a connected region in which pixels in a binarized image of the image data are connected to each other and the number of the pixels exceeds a default threshold value, wherein the features are extracted from input image data of a target document to be matched in the step (a), and it is determined whether or not the target document has a similar image to that of a preliminarily stored reference document, based on a comparison of the features thus extracted with features of the image of the reference document. The method further includes the steps of: (b) determining (i) whether or not the target document is an N-up document on which plural documents are laid out, and (ii) the number of images laid out on the N-up document when it is determined that the target document is an N-up document; and (c) detecting a document size of the target document, when it is determined that the target document is an N-up document in the step (b), the step (a) is carried out such that the features are extracted, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

In the similar manner to the first image matching apparatus that has been already described, in the image matching method, it is possible to extract features under the same condition as the reference document even when the target document is an N-up document and images are reduced in size from their original sizes. This makes it possible to accurately determine a similarity to a reference document.

A second image matching apparatus of the present invention includes: a features extraction section for extracting features of an image from input image data, the features extraction section extracting the features based on a connected region in which pixels in a binarized image of the image data are connected to each other and the number of the pixels exceeds a default threshold value, the apparatus (i) causing the features extraction section to extract the features from input image data of a target document to be matched, and (ii) determining whether or not the target document has a similar image to that of a preliminarily stored reference document based on a comparison of the features thus extracted with features of the image of the reference document. The apparatus, further includes: a document size detection section that detects a document size of the target document, when the document size that is detected by the document size detection section is smaller than a document size of the reference document, the features extraction section extracting the features, by use of not the default number of pixels but the predetermined number of pixels that varies depending on the document size that is detected by the document size detection section, based on a connected region in which the number of pixels exceeds the predetermined number of pixels that varies depending on the document size.

In the arrangement, even in a case where a document size of the target document is smaller than a document size of the reference document and an image thereof is reduced in size, in the features extraction section, a threshold value for extracting a connected region to be subjected to features calculation is set so as to vary depending on a reduction ratio of the target document. This can improve accuracy in matching in an N-up document.

Note that, in the arrangement, the threshold value for extracting a connected region to be subjected to features calculation may be smaller than that of a reference document, thereby resulting in that a noise component such as an isolated dot that is removed in image data of the reference document cannot be removed in a target document. However, this has a less effect on determination, compared with a case where connected regions to be used for extracting features are reduced, and can increase accuracy in determination.

A second image data output processing apparatus of the present invention that carries out an output process with respect to image data, includes: a second image matching apparatus of the present invention; and an output process control section that controls the output process with respect to the image data of the target document in accordance with a determination result of the image matching apparatus.

As described above, the second image matching apparatus of the present invention can determine a similarity with high accuracy, even in a case where a target image to be matched in the target document is reduced in size compared with an image of a reference document.

Accordingly, in a case where image data to be subjected to the output process is similar to that of the reference document, the image data output processing apparatus including such the image matching apparatus can control the output process with high accuracy. This can increase reliability.

Furthermore, each of the image matching apparatuses may be realized by a computer. In this case, the present invention includes an image processing program that causes a computer to function as respective sections in each of the image matching apparatuses so that each of the image matching apparatuses is realized in the computer, and a computer-readable storage medium in which the program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image matching apparatus, comprising
   a features extraction section for extracting features of an image from input image data, the features extraction section extracting the features based on a connected region in which pixels in a binarized image of the image data are connected to each other and the number of the pixels exceeds a default threshold value,
   said apparatus (i) causing the features extraction section to extract the features from input image data of a target document to be matched, and (ii) determining whether or not the target document has a similar image to that of a preliminarily stored reference document based on a comparison of the features thus extracted with features of the image of the reference document;
   said apparatus, further comprising:
   an N-up document determination section that determines (i) whether or not the target document is an N-up document on which plural documents are laid out, and (ii) the number of images laid out on the N-up document when it is determined that the target document is an N-up document; and
   a document size detection section that detects a document, size of the target document,
      when the N-up document determination section determines that the target document is an N-up document, the features extraction section extracting the features, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

2. The image matching apparatus as set forth in claim 1, wherein:
   the features extraction section includes:
   a connected region specifying section that specifies a connected region in which pixels in a binarized image are connected to each other;

a threshold value processing section that extracts a connected region in which the number of pixels exceeds a threshold value, based on a comparison of the number of pixels included in the connected region thus specified by the connected region specifying section with the threshold value;

a feature point calculation process section that calculates a feature point of the connected region extracted by the threshold value processing section; and a features calculation section that calculates features of an image by use of the feature point calculated by the feature point calculation process section, when it is determined that the target document is an N-up document, the threshold value processing section using, as the threshold value, the variant threshold value which varies depending on the number of the images laid out on the target document and the document size instead of the default threshold value.

3. A non-transitory computer-readable storage medium storing a computer program, which causes an image matching apparatus as set forth in claim 1 to operate.

4. An image data output processing apparatus that carries out an output process with respect to image data, the apparatus comprising:

an image matching apparatus; and an output process control section that controls an output process with respect to image data of a target document to be matched in accordance with a determination result of the image matching apparatus, said image matching apparatus, including:

a features extraction section for extracting features of an image from input image data, the features extraction section extracting the features based on a connected region in which pixels in a binarized image of the image data are connected to each other and the number of the pixels exceeds a default threshold value, said image matching apparatus (i) causing the features extraction section to extract the features from input image data of a target document to be matched, and (ii) determining whether or not the target document has a similar image to that of a preliminarily stored reference document based on a comparison of the features thus extracted with features of the image of the reference document:

said image matching apparatus, further including:

an N-up document determination section that determines (i) whether or not the target document is an N-up document on which plural documents are laid out, and (ii) the number of images laid out on the N-up document when it is determined that the target document is an N-up document; and a document size detection section that detects a document size of the target document, when the N-up document determination section determines that the target document is an N-up document, the features extraction section extracting the features, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

5. An image matching method comprising the step of:

(a) extracting features of an image from input image data based on a connected region in which pixels in a binarized image of the image data are connected to each other and the number of the pixels exceeds a default threshold value, wherein the features are extracted from input image data of a target document to be matched in the step (a), and it is determined whether or not the target document has a similar image to that of a preliminarily stored reference document, based on a comparison of the features thus extracted with features of the image of the reference document;

said method, further comprising the steps of:

(b) determining (i) whether or not the target document is an N-up document on which plural documents are laid out, and (ii) the number of images laid out on the N-up document when it is determined that the target document is an N-up document: and (c) detecting a document size of the target document, when it is determined that the target document is an N-up document in the step (b), the step (a) is carried out such that the features are extracted, by use of not the default threshold value but a variant threshold value that varies depending on the number of the images laid out on the N-up document and the document size that are found and detected by the N-up document determination section and the document size detection section, respectively, based on a connected region in which the number of pixels exceeds the variant threshold value.

* * * * *